US011294951B2

(12) United States Patent
Iwamoto et al.

(10) Patent No.: US 11,294,951 B2
(45) Date of Patent: Apr. 5, 2022

(54) INFORMATION PROCESSING DEVICE, INFORMATION PROCESSING SYSTEM, AND INFORMATION PROCESSING PROGRAM

(71) Applicants: MICWARE CO., LTD., Kobe (JP); KI PARTNERS INC., Urayasu (JP)

(72) Inventors: Takashi Iwamoto, Urayasu (JP); Makoto Ito, Kobe (JP); Sumito Yoshikawa, Kobe (JP)

(73) Assignees: MICWARE CO., LTD., Kobe (JP); KI PARTNERS INC., Urayasu (JP)

( * ) Notice: Subject to any disclaimer, the term of this patent is extended or adjusted under 35 U.S.C. 154(b) by 112 days.

(21) Appl. No.: 16/491,921

(22) PCT Filed: Feb. 27, 2018

(86) PCT No.: PCT/JP2018/007174
§ 371 (c)(1),
(2) Date: Sep. 6, 2019

(87) PCT Pub. No.: WO2018/163906
PCT Pub. Date: Sep. 13, 2018

(65) Prior Publication Data
US 2021/0133230 A1    May 6, 2021

(30) Foreign Application Priority Data

Mar. 6, 2017  (JP) .............................. JP2017-041206
Mar. 6, 2017  (JP) .............................. JP2017-041207

(51) Int. Cl.
*G06F 16/55* (2019.01)
*G06F 16/51* (2019.01)
(Continued)

(52) U.S. Cl.
CPC .......... *G06F 16/55* (2019.01); *G06F 16/3323* (2019.01); *G06F 16/50* (2019.01);
(Continued)

(58) Field of Classification Search
CPC .... G06F 16/3323; G06F 16/434; G06F 16/50; G06F 16/739; G06F 2200/1614; G06F 2212/455; G06F 2212/464
(Continued)

(56) References Cited

U.S. PATENT DOCUMENTS 9,008,438 B2 *  4/2015  Kawanishi .............. G06F 16/51
                                                           382/195
2003/0069893 A1   4/2003  Kanai et al.
(Continued)

FOREIGN PATENT DOCUMENTS

JP    2001-282813 A    10/2001
JP    2003-298991 A    10/2003
(Continued)

OTHER PUBLICATIONS

International Searching Authority, "International Search Report," issued in connection with International Patent Application No. PCT/JP2018/007174, dated Mar. 27, 2018.
(Continued)

*Primary Examiner* — Shahid A Alam
(74) *Attorney, Agent, or Firm* — Foley & Lardner LLP

(57) ABSTRACT

An information processing device includes a first obtaining unit that obtains, from an external information processing device, image information added to a captured image published for external access by the external information processing device under a preset obtainment condition, a first storage that stores the image information obtained by the obtaining unit, and a first controller that categorizes the image information stored in the first storage under a preset
(Continued)

attribute condition. The image information includes at least positional information and time information each added to the captured image. The first controller categorizes the image information at least based on the positional information and the time information.

11 Claims, 13 Drawing Sheets

(51) Int. Cl.
*G06F 16/332* (2019.01)
*G06F 16/58* (2019.01)
*G06F 16/50* (2019.01)
*G06F 16/738* (2019.01)
*G06F 16/432* (2019.01)

(52) U.S. Cl.
CPC .......... *G06F 16/51* (2019.01); *G06F 16/5866* (2019.01); *G06F 16/434* (2019.01); *G06F 16/739* (2019.01)

(58) Field of Classification Search
USPC .......................................................... 707/740
See application file for complete search history.

(56) References Cited

U.S. PATENT DOCUMENTS

| | | | |
|---|---|---|---|
| 2003/0184653 A1 | 10/2003 | Ohkubo | |
| 2008/0094499 A1* | 4/2008 | Ueno | G01S 19/34 348/372 |
| 2010/0149399 A1* | 6/2010 | Mukai | H04N 21/6581 348/333.02 |
| 2010/0220213 A1* | 9/2010 | Ueno | G01S 19/34 348/231.3 |
| 2011/0150452 A1* | 6/2011 | Toda | G03B 17/24 396/310 |
| 2012/0320248 A1* | 12/2012 | Igarashi | G06F 16/487 348/333.01 |
| 2013/0101223 A1* | 4/2013 | Kawanishi | G06F 16/51 382/195 |
| 2014/0055479 A1* | 2/2014 | Kawanishi | G06F 16/58 345/581 |
| 2014/0149420 A1* | 5/2014 | Shirai | G06F 16/287 707/740 |
| 2015/0244794 A1* | 8/2015 | Poletto | G06F 16/285 715/748 |
| 2015/0244833 A1* | 8/2015 | Grue | G06F 16/5866 709/219 |
| 2017/0019590 A1* | 1/2017 | Nakamura | G06F 16/51 |

FOREIGN PATENT DOCUMENTS

| | | |
|---|---|---|
| JP | 5456944 B1 | 4/2014 |
| JP | 2014-153338 A | 8/2014 |
| JP | 2015-036690 A | 2/2015 |
| JP | 2016-143269 A | 8/2016 |

OTHER PUBLICATIONS

International Searching Authority, "Written Opinion," issued in connection with International Patent Application No. PCT/JP2018/007174, dated Mar. 27, 2018.

* cited by examiner

| Identification number | Time information | | Positional information (in decimal) | | Image file | Source |
|---|---|---|---|---|---|---|
| | Month-day-year (mm/dd/yyyy) | Time (hh:mm) | Latitude | Longitude | | |
| 1 | 11/30/2016 | 23:00 | aa.aaaaa1 | bbb.bbbbb1 | mt.jpg | 2A |
| 2 | 9/21/2016 | 9:15 | aa.aaaaa2 | bbb.bbbbb2 | tower.jpg | 2A |
| 3 | 8/22/2016 | 14:50 | aa.aaaaa3 | bbb.bbbbb3 | fuji.jpg | 2B |
| ... | ... | ... | ... | ... | ... | ... |

Fig.9

| Identification number | Time information | | Positional information (in decimal) | | Image file | Source | User information | | | |
|---|---|---|---|---|---|---|---|---|---|---|
| | Month-day-year (mm/dd/yyyy) | Time (hh:mm) | Latitude | Longitude | | | user ID | gender | age | nationality |
| 1 | 11/30/2016 | 23:00 | aa.aaaaa1 | bbb.bbbbb1 | mt.jpg | 2A | tanaka | female | 22 | JP |
| 2 | 9/21/2016 | 9:15 | aa.aaaaa2 | bbb.bbbbb2 | tower.jpg | 2A | cho | unknown | 43 | CN |
| 3 | 8/22/2016 | 14:50 | aa.aaaaa3 | bbb.bbbbb3 | fuji.jpg | 2B | dave | male | 65 | US |
| ... | ... | ... | ... | ... | ... | ... | ... | ... | ... | ... |

Fig.16

| Identification number | Image information |||||||
| --- | --- | --- | --- | --- | --- | --- | --- |
| | Positional information || Time information || Subject information | Image file |
| | Latitude | Longitude | Month-day-year (mm/ddd/yyy) | Time (hh:mm) | | |
| 1 | aa.aaaaa1 | bbb.bbbbb1 | 11/30/2016 | 23:00 | Mountain | mt.jpg |
| 2 | aa.aaaaa2 | bbb.bbbbb2 | 9/21/2016 | 9:15 | City tower | tower.jpg |
| 3 | aa.aaaaa3 | bbb.bbbbb3 | 8/22/2016 | 14:50 | Mountain captured from a distance | fuji.jpg |
| ... | ... | ... | ... | ... | ... | ... |
| X1 | aa.aaaaa4 | bbb.bbbbb4 | 7/31/2017 | 15:12 | City amusement park | amusement.jpg |
| X2 | aa.aaaaa5 | bbb.bbbbb5 | 8/31/2017 | 18:25 | Sunset | sun.jpg |
| ... | ... | ... | ... | ... | ... | ... |

INFORMATION PROCESSING DEVICE, INFORMATION PROCESSING SYSTEM, AND INFORMATION PROCESSING PROGRAM

FIELD OF INVENTION

The present invention relates to an information processing device, an information processing system, and an information processing program.

The present application claims priority under 37 U.S.C. § 371 to International Patent Application No. PCT/JP2018/007174, filed Feb. 27, 2018, which claims priority to Japanese Patent Application No. 2017-041206, filed on Mar. 6, 2017, and Japanese Patent Application No. 2017-041207, filed on Mar. 6, 2017. The contents of these applications are hereby incorporated by reference in their entireties.

BACKGROUND ART

Many types of network service content have been developed, including social networking services (SNS) (refer to Non Patent Literature 1).

CITATION LIST

Non Patent Literature

Non Patent Literature 1: "Instagram," Facebook Japan, Inc. (URL: https://www.instagram.com)
Non Patent Literature 2: "Facebook," Facebook Japan, Inc. (URL: https://ja-jp.facebook.com)

SUMMARY OF INVENTION

Technical Problem

The techniques described in Non Patent Literature 1 and Non Patent Literature 2 allow a user to publish captured images through a network for external access, but have limited the use of such published captured images to viewing.

In response to the above issue, one or more aspects of the present invention are directed to an information processing device, an information processing system, and an information processing program that allow captured images published for external access to be used for purposes other than viewing.

Solution to Problem

An information processing device according to one aspect of the present disclosure includes an obtaining unit, a storage, and a controller. The obtaining unit obtains, from an external information processing device, image information added to a captured image published for external access by the external information processing device under a preset obtainment condition. The storage stores the image information obtained by the obtaining unit. The controller categorizes the image information stored in the storage under a preset attribute condition. The image information includes at least positional information and time information each added to the captured image. The controller categorizes the image information at least based on the positional information and the time information.

The present disclosure allows captured images published for external access by the external information processing device to be used for purposes other than viewing. More specifically, the information processing device according to the above aspect of the present disclosure includes the obtaining unit, the storage, and the controller. The controller categorizes the image information at least based on the positional information and the time information. Thus, the controller can collect image information based on the relationship between the time and the position of image capturing.

In the above aspect, the obtainment condition is relevant information relevant to the captured image stored in a manner associated with the captured image. The obtaining unit may obtain the captured image from the external information processing device based on the relevant information relevant to the captured image stored in a manner associated with the captured image.

In this structure, the obtaining unit obtains a captured image from the external information processing device based on relevant information stored in a manner associated with the captured image. For example, a widely-used term relevant to the captured image may be used as the relevant information to improve the reliability of information.

In the above aspect, the image information may include information about an account for content provided by the external information processing device.

In this structure, user attribute information about a user posting a captured image through the content provided by the external information processing device is obtained. This structure can collect information that meets specific and niche needs.

An information processing program according to another aspect of the present disclosure causes a computer to implement obtaining image information, storing the image information, and categorizing the image information. In obtaining the image information, the computer obtains, from an external information processing device, image information added to a captured image published for external access by the external information processing device under a preset obtainment condition. In storing the image information, the computer stores the image information obtained in obtaining the image information. In categorizing the image information, the computer categorizes the image information stored in storing the image information under a preset attribute condition. The image information includes at least positional information and time information each added to the captured image. In categorizing the image information, the computer categorizes the image information at least based on the positional information and the time information.

The present disclosure allows captured images published for external access by the external information processing device to be used for purposes other than viewing. More specifically, the information processing program according to the above aspect of the present disclosure includes obtaining image information, storing the image information, and categorizing the image information. In categorizing the image information, the computer categorizes the image information at least based on the positional information and the time information, thus collecting image information based on the relationship between the time and the position of image capturing.

An information processing system according to another aspect of the present disclosure includes an external information processing device and an information processing device. The external information processing device publishes a captured image captured and transmitted by an information processing terminal for external access. The information processing device communicates with the information processing terminal and the external information processing device. The information processing device includes an obtaining unit, a storage, a controller, and a communication unit. The obtaining unit obtains, from the external information processing device, image information added to the captured image published for external access by the external information processing device under a preset obtainment condition. The storage stores the image information obtained by the obtaining unit. The controller categorizes the image information stored in the storage under a preset attribute condition. The communication unit transmits the categorized image information to the information processing terminal. The image information includes at least positional information and time information each added to the captured image. The controller categorizes the image information at least based on the positional information and the time information.

The present disclosure allows captured images published for external access by the external information processing device to be used for purposes other than viewing. More specifically, the information processing device according to the above aspect of the present disclosure includes the obtaining unit, the storage, the controller, and the communication unit. The image information includes at least positional information and time information each added to the captured image. The controller categorizes the image information at least based on the positional information and the time information, thus collecting image information based on the relationship between the time and the position of image capturing.

An information processing device according to another aspect of the present disclosure includes an obtaining unit, a storage, a controller, and a communication unit. The obtaining unit obtains, from an external information processing device, image information added to a captured image published for external access by the external information processing device under a preset obtainment condition. The storage stores the image information obtained by the obtaining unit. The controller generates spot information based on the image information stored in the storage. The communication unit outputs the spot information generated by the controller to an information processing terminal. The image information includes at least positional information and time information each added to the captured image. The spot information is generated from the image information at least based on the positional information and the time information.

The present disclosure allows captured images published for external access by the external information processing device to be used for purposes other than viewing. More specifically, the information processing device according to the above aspect of the present disclosure includes the obtaining unit, the storage, the controller, and the communication unit. The spot information is generated from the image information at least based on the positional information and the time information. Thus, the spot information generated by collecting the image information based on the relationship between the time and the position of image capturing is available through the information processing terminal.

In the above aspect, the spot information may be updatable information.

In this structure, the spot information, which is updatable information, is updated constantly to the latest to maintain the freshness of information.

In the above aspect, the spot information may be stored into the storage.

The information processing device can thus easily generate spot information representing a group of pieces of image information without relying on other devices.

In the above aspect, the communication unit may use a group of pieces of image information as the spot information, and output positional information about the group of pieces of image information to the information processing terminal.

In this structure, the communication unit can output, to the information processing terminal, the spot information as a single set of information representing a group of pieces of image information together with the positional information, without outputting all data representing the image information from the information processing device to the information processing terminal. This facilitates communication with the information processing terminal, thus facilitating use of the spot information.

In the above aspect, the spot information may be point of interest (POI) information.

In this structure, the spot information is useful for a navigation function. The spot information is fresher than POI information used with an ordinary navigation function having less frequent updates, and thus can serve as highly reliable POI information.

An information processing system according to another aspect of the present disclosure includes an information processing device, an information processing terminal, and an external information processing device that are communicably connected to one another. The information processing device includes a storage that stores image information added to a captured image published for external access by the external information processing device. The information processing terminal includes a display that displays spot information generated based on the image information stored in the storage. The image information includes at least positional information and time information each added to the captured image. The spot information is generated from the image information at least based on the positional information and the time information. The spot information is stored into the storage.

The present disclosure allows captured images published for external access by the external information processing device to be used for purposes other than viewing. More specifically, the information processing device according to the above aspect of the present disclosure includes the storage that stores image information added to a captured image published for external access by the external information processing device. The information processing terminal includes the display. The display displays the spot information. The spot information is generated based on the image information stored in the storage. The spot information is generated from the image information at least based on the positional information and the time information. The spot information is stored into the storage. The spot information is generated by collecting pieces of image information based on the relationship between the time and the position of image capturing. The spot information is thus available through the information processing terminal.

An information processing program according to another aspect of the present disclosure causes a computer to implement obtaining image information, storing the image information, generating spot information, and outputting the spot information. In obtaining the image information, the computer obtains, from an external information processing device, image information added to a captured image published for external access by the external information processing device under a preset obtainment condition. In storing the image information, the computer stores the image information obtained in obtaining the image information. In generating the spot information, the computer generates spot information based on the image information stored in storing the image information. In outputting the spot information, the computer outputs the spot information generated in generating the spot information to an information processing terminal. The image information includes at least positional information and time information each added to the captured image. The spot information is generated from the image information at least based on the positional information and the time information.

The present disclosure allows captured images published for external access by the external information processing device to be used for purposes other than viewing. More specifically, the program according to the above aspect of the present disclosure causes the computer included in the information processing device to implement obtaining image information, storing the image information, generating spot information, and outputting the spot information. In obtaining the image information, the computer obtains, from an external information processing device, image information added to a captured image published for external access by the external information processing device under a preset obtainment condition. In storing the image information, the computer stores the image information obtained by the obtaining unit. In generating the spot information, the computer generates the spot information based on the image information stored in storing the image information. In outputting the spot information, the computer outputs the spot information generated in generating the spot information to the information processing terminal. The spot information is generated from the image information at least based on the positional information and the time information, and is thus available through the information processing terminal.

An information processing program according to another aspect of the present disclosure causes a computer including an information processing device, an information processing terminal, and an external information processing device communicably connected to one another to implement storing image information and displaying spot information. In storing the image information, the computer stores image information added to a captured image published for external access by the external information processing device into the information processing device. In displaying the spot information, the computer displays, on the information processing terminal, spot information generated based on the image information stored in storing the image information. The image information includes at least positional information and time information each added to the captured image. The spot information is generated from the image information at least based on the positional information and the time information. The spot information is stored into a storage.

The present disclosure allows captured images published for external access by the external information processing device to be used for purposes other than viewing. More specifically, the program according to the above aspect of the present disclosure causes the computer included in an information processing system including the information processing device, the information processing terminal, and the external information processing device communicably connected to one another to implement storing image information and displaying spot information. In storing the image information, the computer stores image information added to a captured image published for external access by the external information processing device into the information processing device. In displaying the spot information, the computer displays, on the information processing terminal, spot information generated based on the image information. The spot information is stored into the storage after categorized at least based on the positional information and the time information. Thus, the spot information is available through the information processing terminal.

Advantageous Effects

The information processing device, the information processing system, and the information processing program according to the present disclosure allow captured images published for external access to be used for purposes other than viewing.

BRIEF DESCRIPTION OF THE DRAWINGS

FIG. 9 is a diagram describing a data table including image information to be stored in a storage in an information processing device according to another embodiment.

FIG. 16 is a diagram describing a data table to be stored in the information processing device in the information processing system according to the other embodiment.

DETAILED DESCRIPTION

Embodiments of the present invention will now be described below with reference to the drawings.

An information processing system according to one embodiment includes an information processing device 1, an external information processing device 2, and an information processing terminal 3 to be used by a user communicably connected to one another. For example, the information processing device 1, the external information processing device 2, and the information processing terminal 3 are connected wirelessly.

Figure 1:
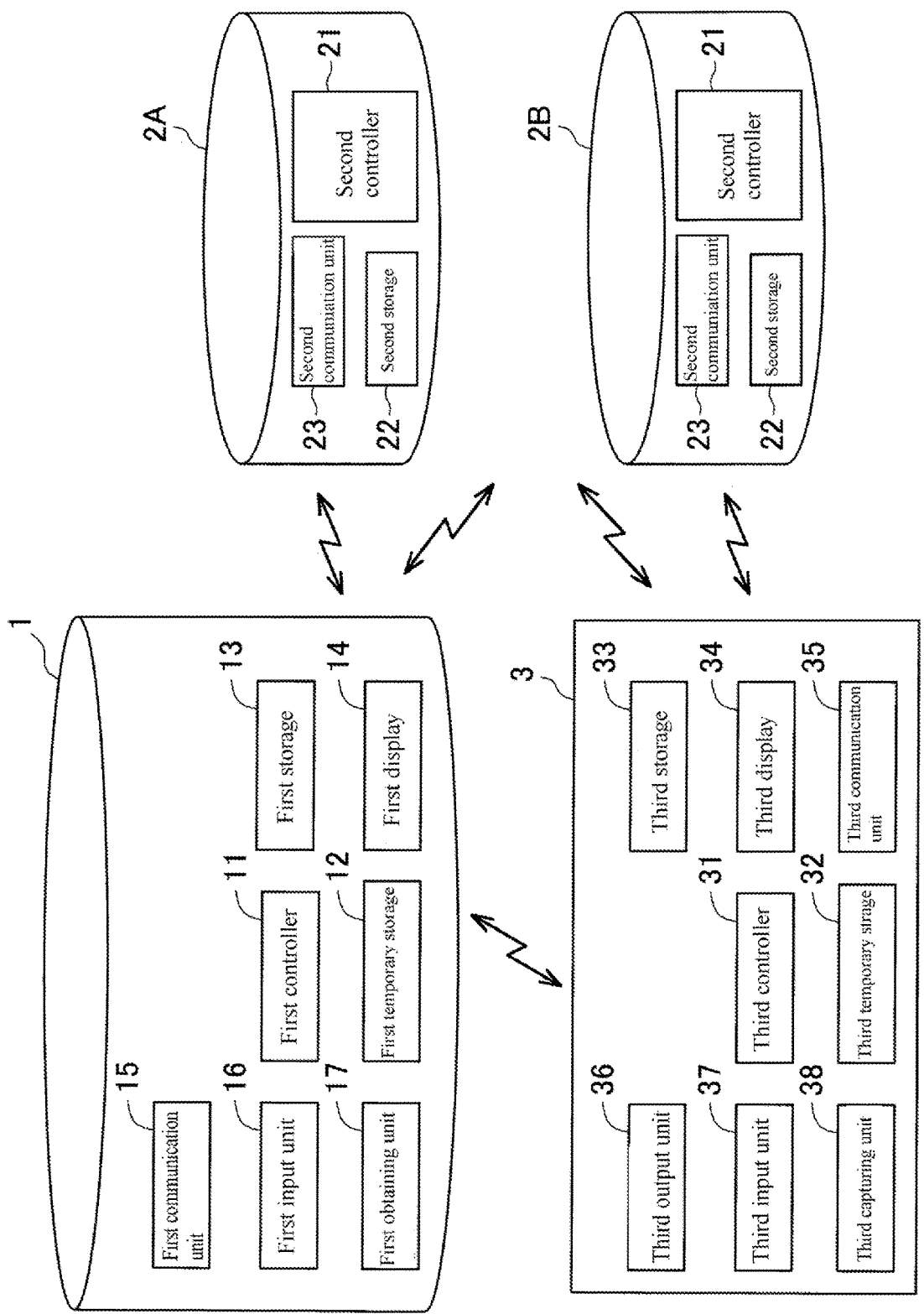
FIG. 1 is a schematic block diagram of an information processing system according to an embodiment.

As shown in FIG. 1, the information processing device 1 includes at least a controller (hereafter also a first controller) 11, a first temporary storage 12, a storage (hereafter also a first storage) 13, a first display 14, a communication unit (hereafter also a first communication unit) 15, a first input unit 16, and an obtaining unit (hereafter also a first obtaining unit) 17.

The first controller 11 has at least a crawling function, an analysis function, and a categorization function. The crawling function includes obtaining images from the external information processing device 2. The crawling function is implemented by a computer executing a crawling program. The analysis function is to analyze image data obtained by the first obtaining unit 17. The analysis function is implemented by a computer executing an analysis program. The categorization function is to categorize the image data obtained by the first obtaining unit 17. The categorization function is implemented by a computer executing a categorization program. For example, the first controller 11 operates in accordance with the crawling program, the categorization program, or the analysis program stored in the first storage 13. More specifically, the first controller 11 includes a central processing unit (CPU).

The first controller 11 generates spot information based on image information stored in the first storage 13 (refer to below). More specifically, the first controller 11 generates spot information from image information at least based on positional information and time information. The first controller 11 categorizes the image information stored in the first storage 13 under a preset attribute condition (time information or positional information). The categorization function according to the present embodiment to categorize the image information at least based on the positional information and the time information further includes categorizing image information based on captured images (refer to image files shown in FIG. 2). The image information is categorized in this manner. Under each preset attribute condition, a group of pieces of image information are collected and used as spot information. The spot information thus represents a group of pieces of image information (refer to spot information P1 to spot information P6 shown in FIGS. 7 and 8).

The first temporary storage 12 temporarily stores information to be processed by the first controller 11. The first temporary storage 12 may be a volatile memory, such as a random access memory (RAM). The first temporary storage 12 temporarily stores information to be generated through the processing performed by the first controller 11.

The first storage 13 stores the crawling program, the analysis program, the categorization program, and various items of information used to perform the crawling, analysis, and categorization. The first storage 13 may be a non-volatile memory, such as a read only memory (ROM). The non-volatile memory may be a flash memory or a hard disk drive (HDD). The first storage 13 stores the image information obtained by the first obtaining unit 17 (refer to FIG. 2). The first storage 13 stores programs and data for software (hereafter also the software) for providing content (hereafter also the content) to be published for external access. More specifically, the software provides content for a map service. The first storage 13 stores the spot information generated by the first controller 11 as a group of pieces of image information.

The first display 14 displays, for example, a request to the information processing device 1 received by the first input unit 16 for managing the information processing device 1. The first display 14 may display map information. For example, the first display 14 can visualize and display the spot information (refer to spot information P1 to spot information P6 shown in FIGS. 7 and 8) representing a group of pieces of image information on a map. The spot information may be generated from a large number of image information pieces stored in the first storage 13 based on time information and positional information each falling within the preset range defined by attribute information. The first display 14 is not limited to a touch panel incorporating a display device and a position input device, but may simply be a display device.

The first communication unit 15 is communicably connected to the external information processing device 2 and the information processing terminal 3. The first communication unit 15 transmits and receives captured images and information (image information) or spot information. The first communication unit 15 also outputs spot information generated by the first controller 11 to the information processing terminal 3. More specifically, the first communication unit 15 can perform communication in accordance with communication standards such as wireless communication, infrared-ray communication, Wi-Fi (registered trademark), Bluetooth (registered trademark), and Bluetooth Low Energy (BLE).

The first input unit 16 receives a request to the information processing device 1. In the present embodiment, the first obtaining unit 17 can receive, from the external information processing device 2, a request to obtain image information (refer to FIG. 2). The first input unit 16 according to the present embodiment receives, for example, an input through the first display 14 as a touch panel (including a character input or a direct touch input on a specific segment of the first display 14), a speech input through a speech input unit (not shown), an input through a hardware key (not shown), and an input through an external input device (not shown).

Figures 2, 3:
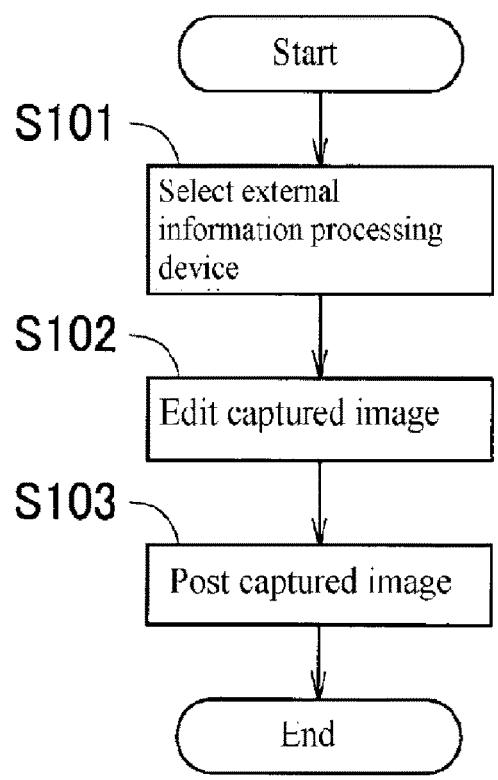
FIG. 2 is a diagram describing a data table including image information to be stored in a storage in an information processing device according to the embodiment.
FIG. 3 is a flowchart of a process for publishing captured images captured by an information processing terminal for external access through an external information processing device according to the embodiment.

The first obtaining unit 17 obtains captured images and image information added to the captured images (refer to FIG. 2) from the external information processing device 2 under a preset obtainment condition. More specifically, the first obtaining unit 17 obtains captured images based on relevant information about the captured images stored in the external information processing device 2 in a manner associated with the captured images. The obtainment condition herein refers to the relevant information about the captured images stored in a manner associated with the captured images in the external information processing device 2. As shown in FIG. 2, the image information includes at least positional information and time information added to the captured images when the images are captured. In the present embodiment, the image information simply includes information about the captured images. More specifically, the image information includes time information and positional information. The first obtaining unit 17 obtains, in addition to the image information, image files with the image information.

The external information processing devices 2 (2A and 2B) each publish captured images transmitted from the information processing terminal 3 and received by a second communication unit 23 for external access. The external information processing devices 2 (2A and 2B) may provide a social networking service (SNS). The information processing system according to the present embodiment includes, but is not limited to, two external information processing devices 2A and 2B. The information processing system may include a single external information processing device 2, or may include three or more external information processing devices 2. Although FIG. 1 shows a single information processing terminal 3, the information processing system includes two or more information processing terminals 3.

Each external information processing device 2 includes at least a second controller 21, a second storage 22, and the second communication unit 23 for publishing captured images for external access. In the present embodiment, the same reference numerals refer to the corresponding components in the two external information processing devices 2A and 2B.

The second controller 21 has the publishing function of publishing captured images for external access. The publishing function is to publish captured images transmitted from the information processing terminals 3 and received by the second communication unit 23 for external access. In the second controller 21, the publishing function is enabled based on a publishing program stored in the second storage 22. More specifically, the second controller 21 includes a CPU.

The second storage 22 stores the publishing program and various items of information used for publishing captured images for external access. The second storage 22 may be a non-volatile memory, such as a ROM (e.g., a flash memory or an HDD). The second storage 22 stores SNS content (hereafter also external content) for publishing captured images.

The second communication unit 23 is communicably connected to the information processing device 1 and the information processing terminal 3. The second communication unit 23 transmits and receives captured images or information (image information). More specifically, the second communication unit 23 can perform communication in accordance with communication standards such as wireless communication, infrared-ray communication, Wi-Fi (registered trademark), Bluetooth (registered trademark), and BLE.

As shown in FIG. 1, the information processing terminal 3 includes at least a third controller 31, a third temporary storage 32, a third storage 33, a third display 34, a third communication unit 35, a third output unit 36, a third input unit 37, and a third capturing unit 38.

The third controller 31 controls various information processing operations. More specifically, the third controller 31 includes a CPU.

The third temporary storage 32 temporarily stores information to be processed by the third controller 31. The third temporary storage 32 may include a volatile memory, such as a RAM. The third temporary storage 32 temporarily stores information to be generated through the processing performed by the third controller 31.

The third storage 33 stores various information processing programs and various items of information. The third storage 33 may be a non-volatile memory, such as a ROM (e.g., a flash memory or an HDD). The third storage 33 stores captured images captured by the third capturing unit 38, and image information to be added to the captured images.

The third display 34 displays various items of information. The third display 34 displays the captured images in addition to various items of information. The third display 34 displays spot information generated based on image information stored in the first storage 13 in the information processing device 1. The third display 34 is not limited to a touch panel, but may simply be a display device.

The third communication unit 35 is communicably connected to the information processing device 1 and the external information processing devices 2. The third communication unit 35 transmits and receives captured images and information (image information). More specifically, the third communication unit 35 can perform communication in accordance with communication standards such as wireless communication, infrared-ray communication, Wi-Fi (registered trademark), Bluetooth (registered trademark), and BLE.

The third output unit 36 outputs, to the third display 34, the captured images captured by the third capturing unit 38, the content provided by the information processing device 1, and data for displaying, for example, the external content (e.g., an SNS) provided by the external information processing device 2. The third output unit 36 may output data not for displaying on the third display 34, such as sound, to a speaker.

The third input unit 37 can instruct the third communication unit 35 to transmit captured images and their image information to the external information processing device(s) 2. The third input unit 37 can instruct the third capturing unit 38 to perform image capturing. The third input unit 37 according to the present embodiment may receive, for example, an input through the third display 34 as a touch panel (including a character input or a direct touch input on a specific segment of the third display 34), a speech input through a speech input unit (not shown), an input through a hardware key (not shown), and an input through an external input device (not shown).

The third capturing unit 38 includes, for example, an image sensor for image capturing. The third capturing unit 38 causes the third storage 33 to store captured images. The captured images include image information. The image information includes at least time information indicating the time of image capturing and positional information indicating the position of image capturing. The image information includes, for example, angle information indicating the angle of image capturing, and the dimensions of each captured image.

As described above, the spot information is generated by the information processing device 1 according to the present embodiment based on image information, and thus is updatable information as well as regional information. Thus, the spot information is point of interest (POI) information, which can be updated as appropriate.

The operation of the information processing system (the relationship between the information processing device 1 and the external information processing device(s) 2, the relationship between the information processing device 1 and the information processing terminal 3, and the relationship between the external information processing device(s) 2 and the information processing terminal 3) according to the present embodiment will now be described with reference to FIGS. 2 to 10.

The relationship between the external information processing device(s) 2 and the information processing terminal 3 will be described first with reference to FIG. 3. The operation of the external information processing device 2 for publishing captured images captured by the information processing terminal 3 for external access will be described.

The third controller 31 in the information processing terminal 3 captures images with the third capturing unit 38, and selects an external information processing device 2 to be used for publishing captured images for external access (step S101). The third controller 31 may herein select one of the two external information processing devices 2A and 2B, or may select the multiple external information processing devices 2 (2A, 2B) at a time. The external information processing device 2A is selected in the present embodiment.

Subsequently to step S101, the third controller 31 edits the captured images before transmitting the captured images to the external information processing device 2A. The editing herein may be optional. The third controller 31 may transmit the captured images directly without editing (step S102). Although not limiting, the third controller 31 edits the captured images in step S102 in the present embodiment. In some embodiments, the third controller 31 may edit the captured images captured by the third capturing unit 38 before step S101.

After the editing in step S102, the third controller 31 transmits the captured images and image information added to the captured images to the external information processing device 2A through the third communication unit 35, and posts the captured images to be published through the external content provided by the external information processing device 2A (step S103). After the posting, the second controller 21 in the external information processing device 2A publishes the posted captured images for external access, and ends the process.

Figure 4:
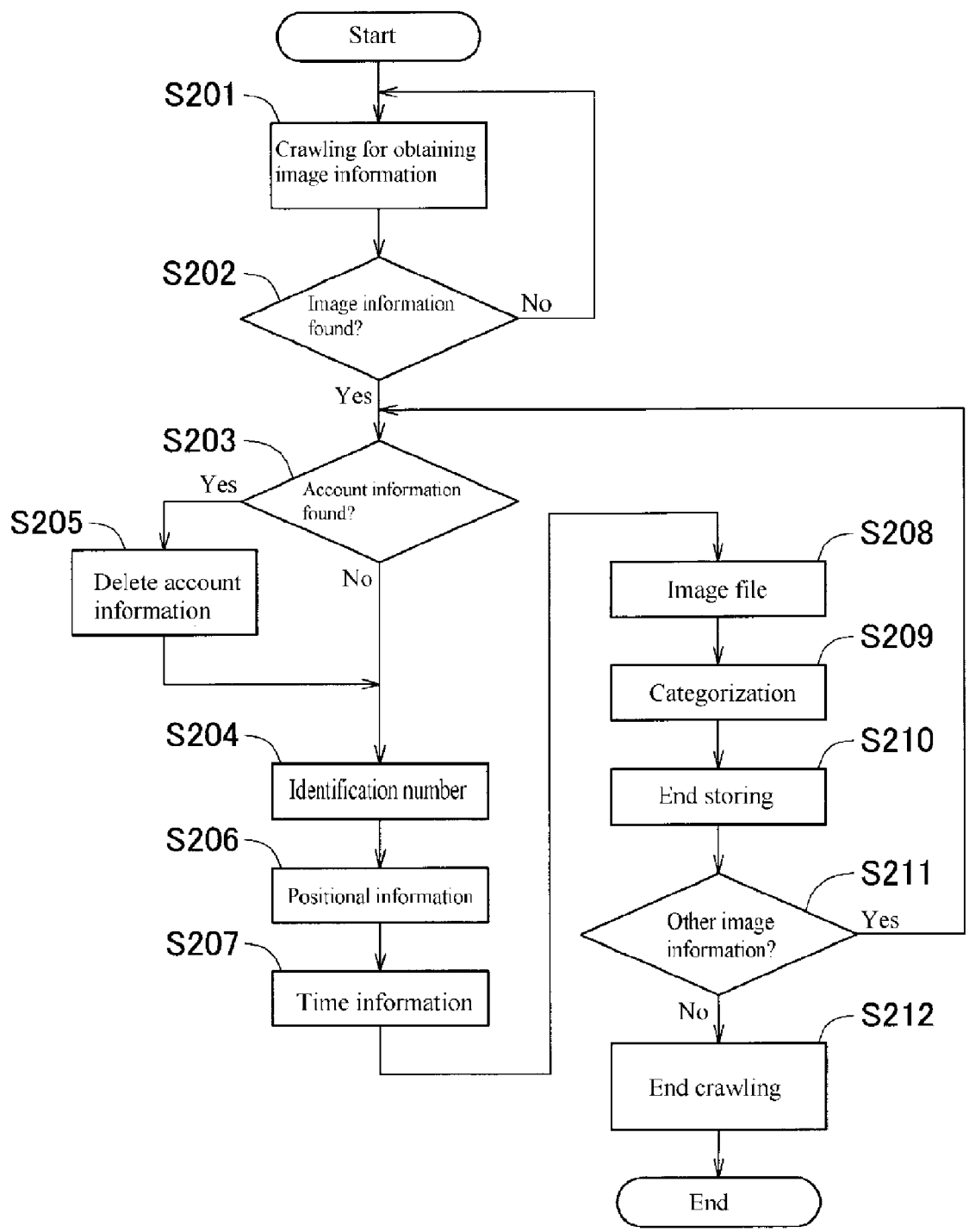
FIG. 4 is a flowchart of a process performed by the information processing device for obtaining and storing the image information about the captured images published by the external information processing device according to the embodiment.

The relationship between the information processing device 1 and the external information processing device(s) 2 will now be described with reference to FIG. 4. The operation of the information processing device 1 for obtaining and storing the image information about the captured images published through the external content by the external information processing device 2 (2A or 2B) will be described. Although not limiting, the captured images and the image information added to the captured images are obtained in the present embodiment. In some embodiments, at least the image information may be obtained.

An operator of the information processing device 1 inputs a request for obtaining image information from the external information processing device 2 through the first input unit 16. This input operation causes the first obtaining unit 17 to provide a request to obtain image information in accordance with the crawling program stored in the first storage 13 for performing operational control (or to be executed) in the first controller 11, and to check whether any captured image has been published for external access by the external information processing device 2A or 2B (search through crawling) (step S201). The search through crawling is performed using links or hashtags set as search conditions with relevant terms associated with captured images, and checks whether any search target matches the search conditions.

When any captured image is found in step S201 (Yes in step S202), the first obtaining unit 17 obtains the captured image and image information about the captured image. When no captured image is found in step S201 (No in step S202), the first obtaining unit 17 returns to step S201 to perform the search through crawling again.

After obtaining the captured image and the image information about the captured image in step S202, the first controller 11 adds an identification number to the image information (step S204) when the image information includes no account information about the external content published for external access by the external information processing device 2 (No in step S203). Steps S201 and S202 described above are collectively defined as an obtaining process.

For the captured image and the image information about the captured image obtained in step S202, when the image information includes account information about the external content published for external access by the external information processing device 2 (Yes in step S203), the first controller 11 deletes the account information (step S205). The first controller 11 then adds an identification number to the image information (step S204). In this manner, the account information is deleted in step S205. Thus, the information processing device 1 stores no account information about the external content published for external access by the external information processing device 2. This structure prevents personal information about a user included in the account information about the external content from leaking through the information processing device 1.

After adding the identification number to the image information in step S204, the first controller 11 stores positional information (step S206) and time information (step S207) included in the image information into the first storage 13. The first controller 11 may store the positional information included in the image information after storing the time information into the first storage 13.

After storing the positional information and the time information included in the image information into the first storage 13 in steps S206 and S207, the first controller 11 stores an image file of the captured image into the first storage 13 (step S208).

For the image information in the image file stored in the first storage 13 in step S208, the first controller 11 categorizes the captured image and the image information about the captured image in accordance with (or by executing) the categorization program (step S209). In the present embodiment, step S209 is defined as a categorizing process. The first controller 11 according to the present embodiment categorizes the information using seasons including spring, summer, fall, and winter, or using time periods including morning, afternoon, and night based on, for example, the time information. The first controller 11 also defines area ranges with latitudes and longitudes in decimal based on the positional information, and categorizes the spot areas for each defined area range. Further, the first controller 11 may perform image processing for a subject captured in each captured image, and image data analysis for identifying the captured subject. After analyzing the image data, the first controller 11 can categorize the information by subject. The analysis of image data refers to categorizing the image data by subject based on, for example, the degree of matching between the image data and prestored image information about a relevant landmark. The first controller 11 identifies the external information processing device 2 (2A or 2B) that has obtained any captured image, and categorizes the information about the external information processing device 2 (2A or 2B). Through such categorization, the first controller 11 generates spot information based on image information stored in a storing step (described later).

The categorization performed as described above in step S209 completes the operation of the first controller 11 for storing the captured image and the image information about the captured image into the first storage 13 (step S210). FIG. 2 shows captured images and image information about the captured images stored in the first storage 13.

When other image information is found after step S210 (Yes in step S211), the first controller 11 returns to step S203. When no other image information is found (No in step S211), the first controller 11 ends the crawling (step S212), and ends the process. In this process, the first controller 11 basically obtains image information continuously while the information processing device 1 is operating, and thus continuously performs the processing in steps S201 through S211. The processing in steps S204 through S210 is collectively defined as the storing process. The first controller 11 generates spot information based on the image information stored in the storing process (this generation process is defined as a control process).

Figure 5:
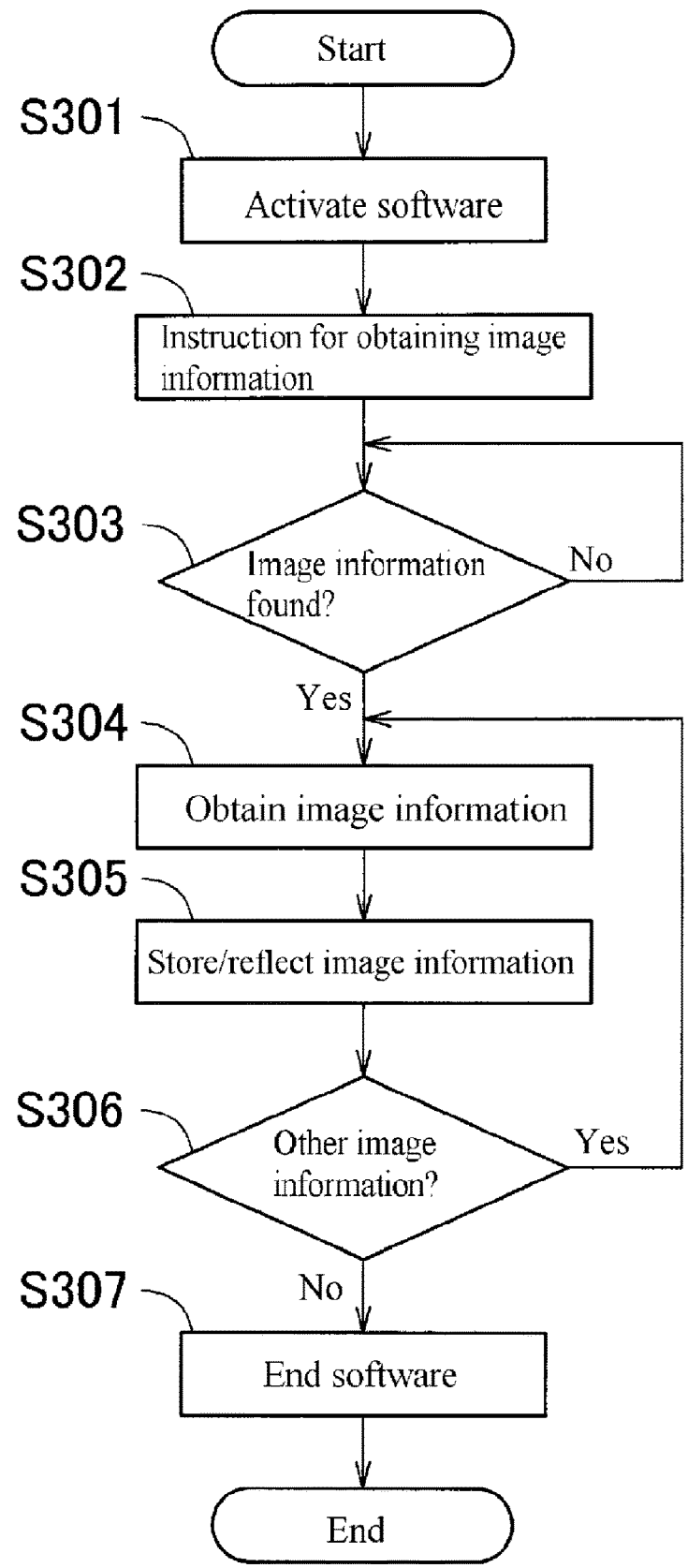
FIG. 5 is a flowchart of a process for reflecting the image information about the captured images in content to be published for external access by the information processing device according to the embodiment.

The operation of the information processing device 1 for reflecting captured images and image information about the captured images (hereafter also the image information) obtained by the first obtaining unit 17 and stored in the first storage 13 in the content to be published for external access by the information processing device 1 (hereafter, the content) will now be described with reference to FIG. 5. Although the process shown in FIG. 4 is separate from the process shown in FIG. 5 in the present embodiment, the processes may be continuous. In some embodiments, the process shown in FIG. 4 may be an operation of software that provides the content (hereafter, the software). Although not limiting, the first obtaining unit 17 obtains the captured images and the image information added to the captured images in the present embodiment. In some embodiments, the first obtaining unit 17 may simply obtain the image information.

The first controller 11 activates the software for providing the content (step S301).

After step S301, the first controller 11 provides an instruction for obtaining the image information obtained by the first obtaining unit 17 and stored in the first storage 13 (step S302). When the image information is found (Yes in step S303), the first controller 11 obtains the captured images and image information about the captured images from the first storage 13 (step S304).

When no image information is found after step S302 (No in step S303), the first controller 11 repeats the processing in step S303.

After obtaining the image information in step S304, the first controller 11 stores the image information into a storage area for the image information in the software in the first storage 13 to reflect (or duplicate) the image information in the content (step S305). Although not limiting, the first controller 11 stores and reflects the image information in the present embodiment. In some embodiments, the first controller 11 may eliminate step S305, and may read the image information as appropriate.

When other image information is found after step S305 (Yes in step S306), the first controller 11 returns to step S304, and obtains the other image information.

When no other image information is found after step S305 (No in step S306), the first controller 11 stops implementing the software (step S307), and ends the process.

Figure 6:
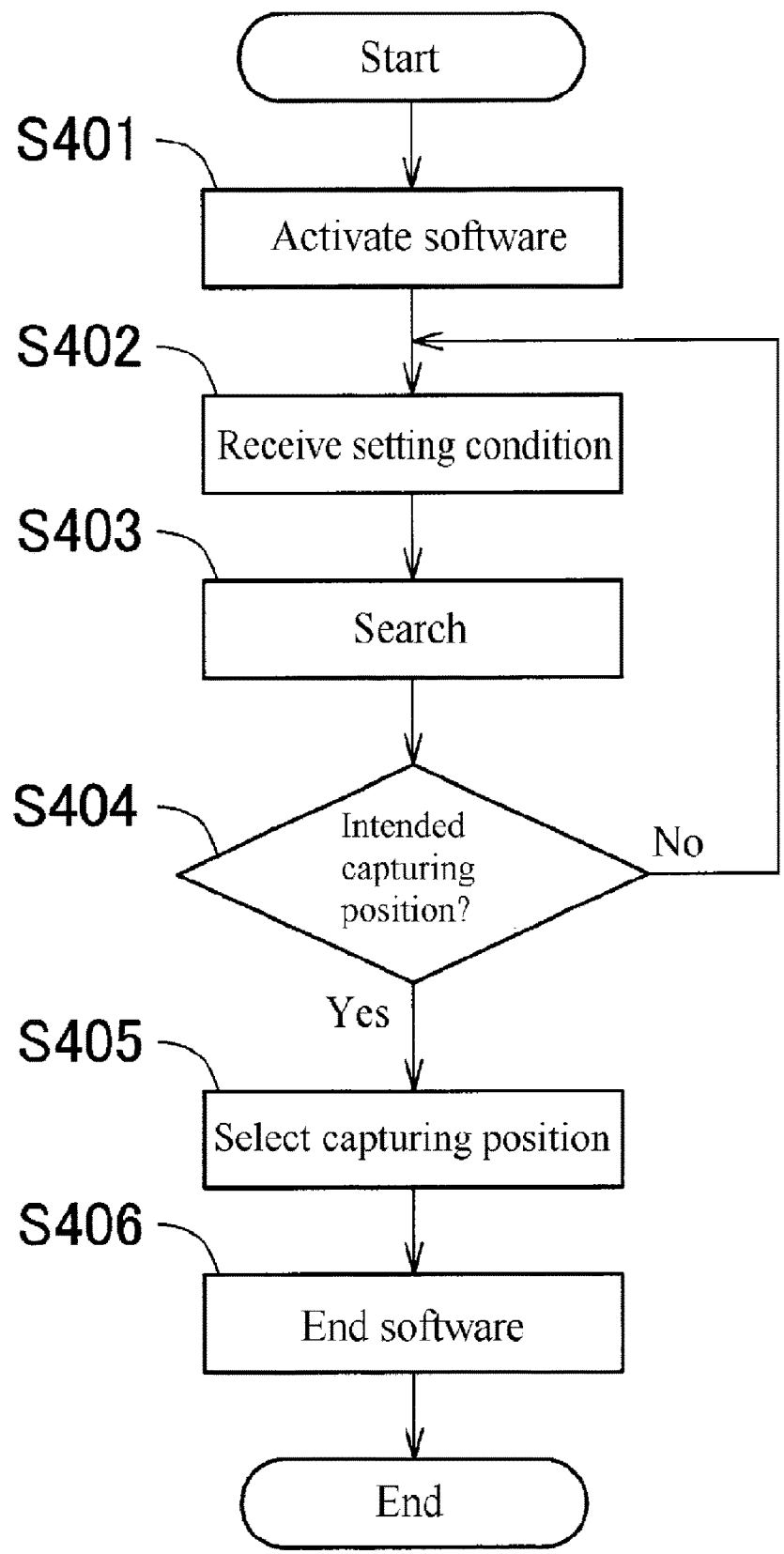
FIG. 6 is a flowchart of a process for displaying spot information at the content to be published for external access by the information processing device according to the embodiment.
Figure 7:
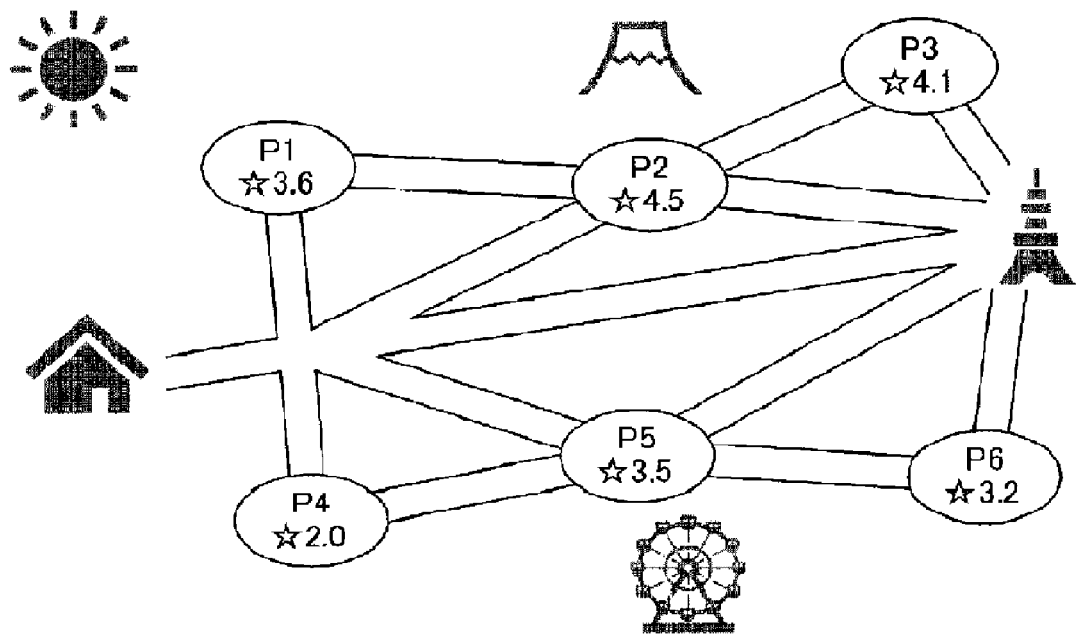
FIG. 7 is a diagram describing the content to be published for external access by the information processing device in the process shown in FIG. 6.
Figure 8:
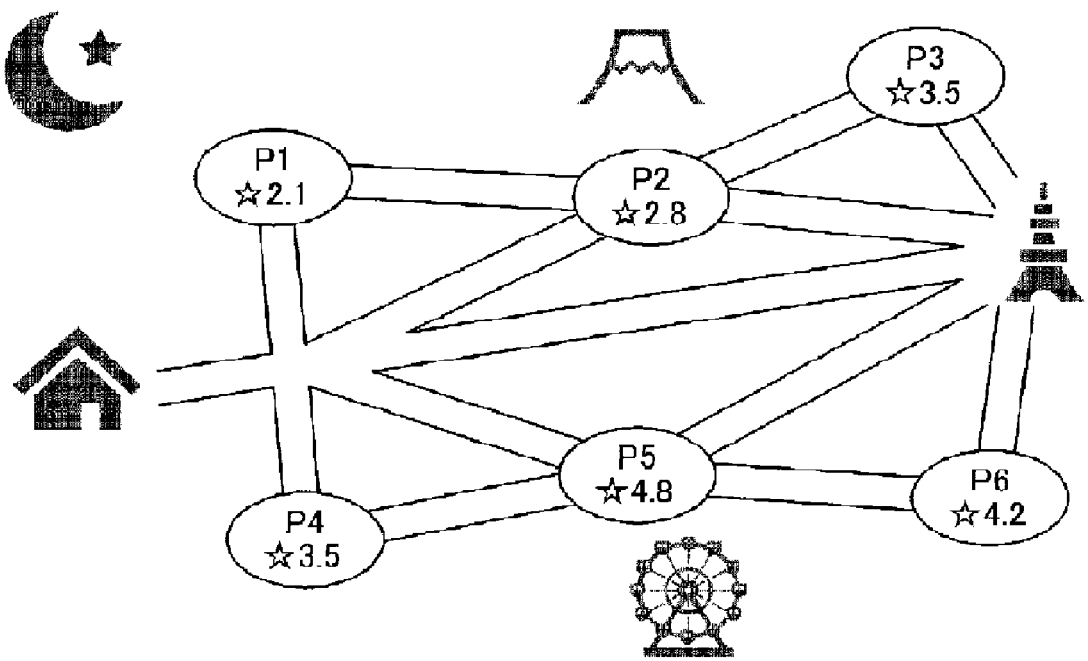
FIG. 8 is a diagram describing the content to be published for external access by the information processing device in the process shown in FIG. 6.

The software implemented by the information processing device 1 will now be described with reference to FIGS. 6 to 8. The software provides content for a map service available through the information processing terminal 3. The software displays spot information generated based on image information included in the data table shown in FIG. 2. The spot information generated based on the image information in the data table shown in FIG. 2 indicates a location. Further, the spot information may indicate the number of people gathering at the spot represented by the number of images captured at the spot. The spot information may thus be customer attraction information indicating the ability to attract customers. As shown in FIGS. 7 and 8, the customer attraction information herein is a numerical value that follows a star sign. A larger number indicates a location with a higher ability to attract customers. For example, the customer attraction information is 1.0 when the number of captured images is not less than a predetermined number but is smallest, and is 5.0 when the number of captured images is greatest. The customer attraction information undergoes data processing to have a numerical value following a star sign that is incremented by 0.1 for every increase in the number of captured images increases.

In the third storage 33 in the information processing terminal 3, the software dedicated to the software implemented by the information processing device 1 (hereafter also dedicated software) is installed.

The third controller 31 first activates the dedicated software (step S401).

After step S401, the third display 34 displays map information. The third input unit 37 receives a setting condition (search condition) for outputting the spot information generated through the above control process (step S402). Subsequently, the third controller 31 performs a search under the input setting condition (step S403). In step S403, the spot information generated through the above control process is output to the information processing terminal 3 (this process is defined as a communication process). The setting condition according to the present embodiment includes a distance condition indicating a distance from a current position, a season condition indicating, for example, spring, summer, fall, or winter, a month and date condition indicating a specific month and date, a sun condition indicating the state of the sun from sunrise to sunset or the state of the sun from sunset to sunrise, a time period condition indicating, for example, morning, afternoon, or night, a time condition indicating a specific time, a selection of the external information processing device 2A or 2B capturing the image information, or a selection of any captured image. Although not limiting, the setting condition according to the present embodiment includes the above conditions. In some embodiments, the setting condition may be associated with a capturing condition for images to be captured, and may include an additional capturing condition such as a capturing direction (capturing angle) or whether a flash is used.

When the search in step S403 finds no spot information (capturing position) that matches the setting condition (No in step S404), the third controller 31 returns to step S402. When newly receiving a setting condition, the third controller 31 performs a search under the received setting condition (step S403).

When the search in step S403 finds spot information (capturing position) that matches the setting condition (Yes in step S404), the third controller 31 displays the matched spot information on the third display 34. More specifically, as shown in FIGS. 7 and 8, the third controller 31 displays spot information P1 to spot information P6 on the map. In FIGS. 7 and 8, an ellipse encircles spot information. The number that follows a star sign encircled in each ellipse in FIGS. 7 and 8 is an index proportional to the number of images captured at the capturing position indicated by the spot information. The index ranges from 1.0 to 5.0. A sun symbol on the map shown in FIG. 7 indicates that the spot information corresponds to daytime, or a time period from sunrise to sunset. A moon symbol on the map shown in FIG. 8 indicates that the spot information corresponds to nighttime, or a time period from sunset to sunrise. Landmarks shown in FIGS. 7 and 8 include a famous mountain, a city tower, a city amusement park, and a current position (house symbol).

The third controller 31 then selects an intended piece of spot information from the spot information appearing on the map shown in FIG. 7 or 8 (step S405) based on an operation performed by the user (input operation through the third input unit 37). The selected piece of spot information is information generated based on the image information stored in the storing step described above. The third controller 31 displays the spot information piece on the third display 34 (this process is defined as a displaying process).

After displaying the intended spot information in step S405, the third controller 31 stops implementing the software (step S406), and ends the process.

The information processing device 1 according to the present embodiment allows captured images published for external access by the external information processing device 2 to be used for purposes other than viewing. More specifically, the first controller 11 in the information processing device 1 according to the present embodiment categorizes image information at least based on the positional information and the time information, thus collecting image information based on the relationship between the time and the position of image capturing. As a result, information about a specific position frequently published for external access by the external information processing device 2 (an external service such as an SNS) can be collected. In the present embodiment, the time information is also categorized. Thus, information about a time period during which images are captured frequently can also be collected. Obtaining such precise image information yields reliable information about the image capturing spot.

The first obtaining unit 17 obtains captured images and can process the captured images. This further improves the reliability of spot information.

The first obtaining unit 17 obtains captured images from the external information processing device 2 based on relevant information about the captured images stored in a manner associated with the captured images. The use of such relevant information relevant to the captured images including, for example, a widely-used term (e.g., a term using a hashtag), improves the reliability of spot information.

The image information to be stored in the first storage 13 simply includes information about the captured images, and includes no personal information. This structure thus prevents personal information from leaking through the obtained captured images.

An information processing program included in the information processing device 1 according to the present embodiment allows use of captured images published for external access by the external information processing device 2. More specifically, the information processing device 1 according to the present embodiment performs the obtaining process, the storing process, and the categorizing process. In the categorizing process, the image information is categorized at least based on the positional information and the time information. The information processing device 1 can thus collect image information based on the relationship between the time and the position of image capturing. As a result, information about a specific position frequently published for external access by the external information processing device 2 (an external service such as an SNS) can be collected. In the present embodiment, the image information is categorized also based on the time information. Thus, information about a time period during which images are captured frequently can also be collected. Obtaining such precise image information yields reliable information about the image capturing spot.

In the present embodiment, the spot information is generated from the image information at least based on the positional information and the time information. In the present embodiment, a computer included in the information processing device 1 implements the obtaining process for obtaining the image information added to the captured images by the external information processing device 2 under a preset obtainment condition, the storing step for storing the image information obtained by the first obtaining unit 17, the control process for generating the spot information based on the image information stored in the storing step, and the communication process for outputting the spot information generated in the control process to the information processing terminal 3. The spot information is generated from the image information at least based on the positional information and the time information. The spot information generated based on the relationship between the time and the position of image capturing is thus available through the information processing terminal 3. More specifically, the user can operate the information processing terminal 3 to display the spot information on the third display 34. The user can also use the information processing terminal 3 to obtain a group of pieces of image information as spot information generated by collecting information (image information) about a specific position frequently published for external access by the external information processing device 2. This allows the user to readily grasp a position with a larger number of pieces of spot information.

In the present embodiment, the information processing device 1 includes the first storage 13 for storing the image information added to the captured images by the external information processing device 2, and the information processing terminal 3 includes the third display 34 for displaying the spot information generated based on the image information stored in the first storage 13. The spot information is generated from the image information at least based on the positional information and the time information, and stored into the first storage 13. In the present embodiment, computers included in the information processing system including the information processing device 1, the information processing terminal 3, and the external information processing device 2 communicably connected to one another may implement the storing step for storing the image information added to the captured images by the external information processing device 2 into the information processing device 1 and the displaying process for displaying, on the information processing terminal 3, the spot information generated based on the image information stored in the storing step. The spot information is generated from the image information at least based on the positional information and the time information, and stored into the first storage 13. The spot information generated by collecting the image information based on the relationship between the time and the position of image capturing is thus available through the information processing terminal 3. More specifically, the spot information can appear on the third display 34 included in the information processing terminal 3. The user can use the information processing terminal 3 to obtain a group of pieces of image information as spot information generated by collecting information (image information) about a specific position frequently published for external access by the external information processing device 2. This allows the user to readily grasp a position with a larger number of pieces of spot information.

In the information processing system according to the present embodiment, the first storage 13 stores image information including at least positional information and time information added to captured images, and the first controller 11 categorizes the image information at least based on the positional information and the time information. The first controller 11 can thus collect image information based on the relationship between the time and the position of image capturing.

The spot information is updatable information, and is thus updated constantly to the latest information to maintain the freshness of the information.

The spot information is stored in the first storage 13. The information processing device 1 can thus easily generate spot information representing a group of pieces of image information without relying on other devices (particularly the external information processing devices 2).

The first communication unit 15 uses a group of pieces of image information as the spot information, and outputs positional information about the group of pieces of image information to the information processing terminal 3. Thus, the first communication unit 15 can output, to the information processing terminal 3, the spot information as a single set of information representing a group of pieces of image information together with the positional information, without outputting all data representing the image information from the information processing device 1 to the information processing terminal 3. This facilitates communication between the information processing device 1 and the information processing terminal 3, thus facilitating use of the spot information.

Although not limiting, the external information processing device 2 is an external device in the present embodiment. In some embodiments, an external information processing system built independently of the information processing device 1 or the information processing terminal 3 may be used.

The image information according to the present embodiment simply includes information associated with the captured images. In some embodiments, the image information may include other information. As shown in FIG. 9, the image information may include user attribute information associated with an account for the external content. In this case, the user attribute information about a user who has posted captured images through the external information processing device 2 can be obtained. This structure collects information that meets specific and niche needs from, for example, foreign visitors to Japan. The image information shown in FIG. 9 includes, as the user attribute information, an ID for the external content, gender, age, and nationality of the user. However, the user attribute information is not limited to the above examples, but may include, for example, information about a hobby that can be freely set as the user attribute information. When the image information includes the user attribute information, the information processing device 1 uses, instead of the process shown in FIG. 4, a process shown in FIG. 10 (described below) to obtain and store image information about captured images published for external access by the external information processing device 2.

Figure 10:
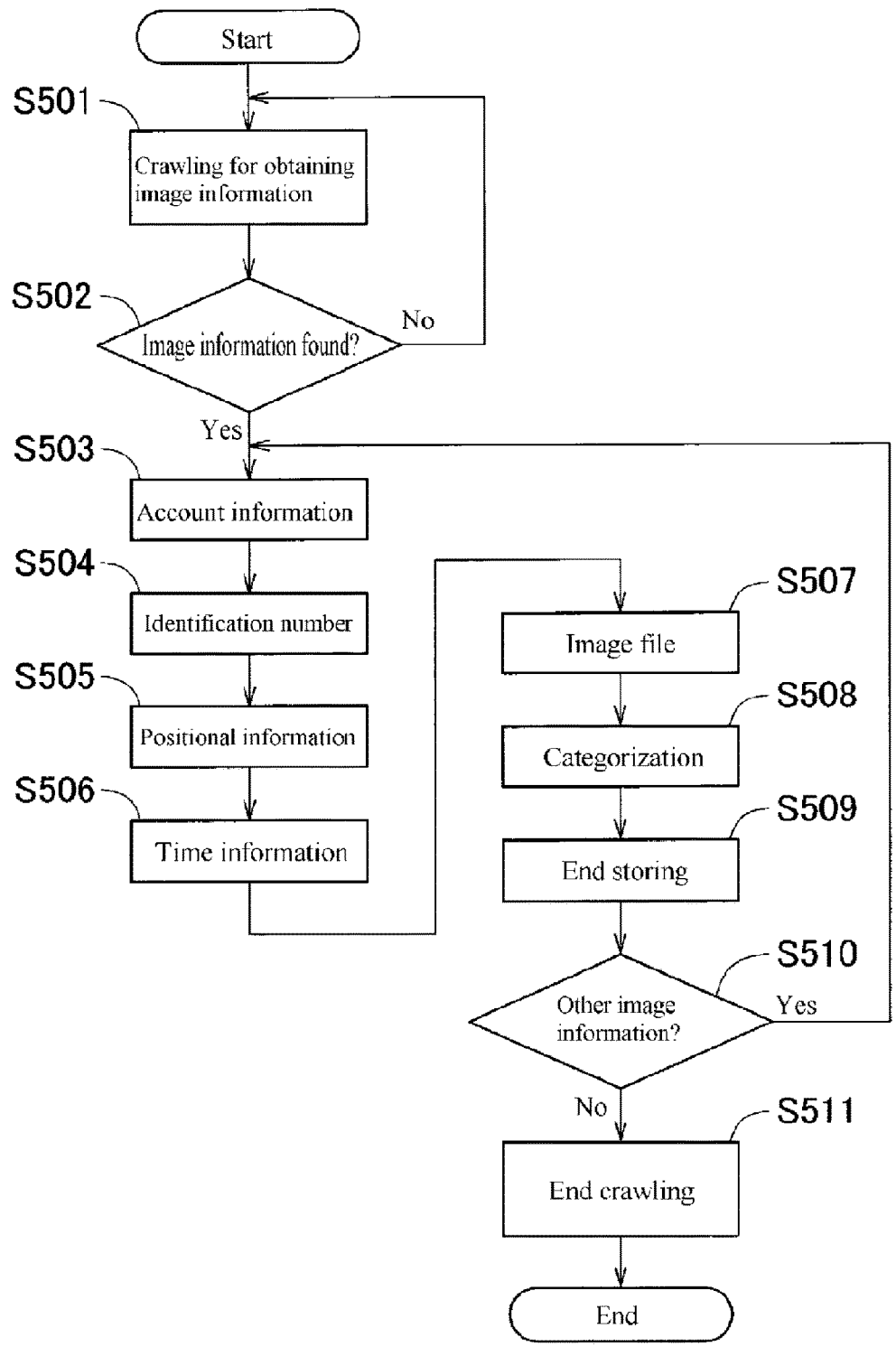
FIG. 10 is a flowchart of a process performed by the information processing device for obtaining and storing image information about captured images published for external access by an external information processing device according to the other embodiment.

The relationship between the information processing device 1 and the external information processing device 2 with the image information including the user attribute information will now be described with reference to FIG. 10. The operation of the information processing device 1 for obtaining and storing the image information about the captured images published for external access through the external content by the external information processing device 2 (2A or 2B) will be described. Although not limiting, the information processing device 1 according to the present embodiment obtains the captured images and the image information added to the captured images. In some embodiments, the information processing device 1 may simply obtain the image information.

An operator of the information processing device 1 inputs a request for obtaining image information from the external information processing device 2 through the first input unit 16. This input operation causes the first obtaining unit 17 to provide a request to obtain image information in accordance with the crawling program stored in the first storage 13 for performing operational control in the first controller 11, and to check whether any captured image has been published for external access by either the external information processing device 2A or 2B (search through crawling) (step S501). This search through crawling is the same as the search through crawling described with reference to FIG. 4.

When any captured image is found in step S501 (Yes in step S502), the first obtaining unit 17 obtains the captured image and image information about the captured image. When no captured image is found in step S501 (No in step S502), the first obtaining unit 17 returns to step S501 to perform the search through crawling again.

After obtaining the captured image and the image information about the captured image in step S502, the first controller 11 stores account information about the external content published for external access by the external information processing device 2 into the first storage 13 (step S503). The first controller 11 then adds an identification number to the image information (step S504).

After adding the identification number to the image information in step S504, the first controller 11 stores positional information (step S505) and time information (step S506) included in the image information into the first storage 13.

After storing the positional information and the time information about the image information into the first storage 13 in step S506, the first controller 11 stores the image file of the captured image into the first storage 13 (step S507).

For the image information in the image file stored in the first storage 13 in step S507, the first controller 11 categorizes the captured image and the image information about the captured image in accordance with (or by executing) the categorization program (step S508). This categorization is the same as the categorization described with reference to FIG. 4.

The categorization performed as described above in step S508 completes the operation of the first controller 11 for storing the captured image and the image information about the captured image into the first storage 13 (step S509). FIG. 9 is a table showing captured images and image information about the captured images stored in the first storage 13.

When other image information is found after step S509 (Yes in step S510, the first controller 11 returns to step S503. When no other image information is found (No in step S510), the first controller 11 ends the crawling (step S511), and ends the process. In this process, the first controller 11 basically obtains image information continuously while the information processing device 1 is operating, and thus continuously performs the processing in steps S501 through S511.

Although the software according to the above embodiment provides the content for a map service, the map service may include a navigation function. The map service including the navigation function can guide the user with spot information on the map appearing on the third display 34 in the information processing terminal 3. The navigation function may be stored in the third storage 33 and controlled by the third controller 31 in the information processing terminal 3, or may be in the first storage 13 and controlled by the first controller 11 in the information processing device 1. In other words, the navigation function may be incorporated in a system including the information processing device 1 and the information processing terminal 3 to display the map and navigation on the third display 34 in the information processing terminal 3. The navigation function may be incorporated in either the information processing device 1 or the information processing terminal 3. More specifically, the navigation function may be stored in the storage in either the information processing device 1 or the information processing terminal 3, and may be controlled by the controller included in the other device. In some embodiments, the navigation function may be stored in a distributed manner in the storages included in both the information processing device 1 and the information processing terminal 3, and may be controlled in a cooperative manner by the controller included in either of the devices or by both the controllers included in the devices.

Figure 11:
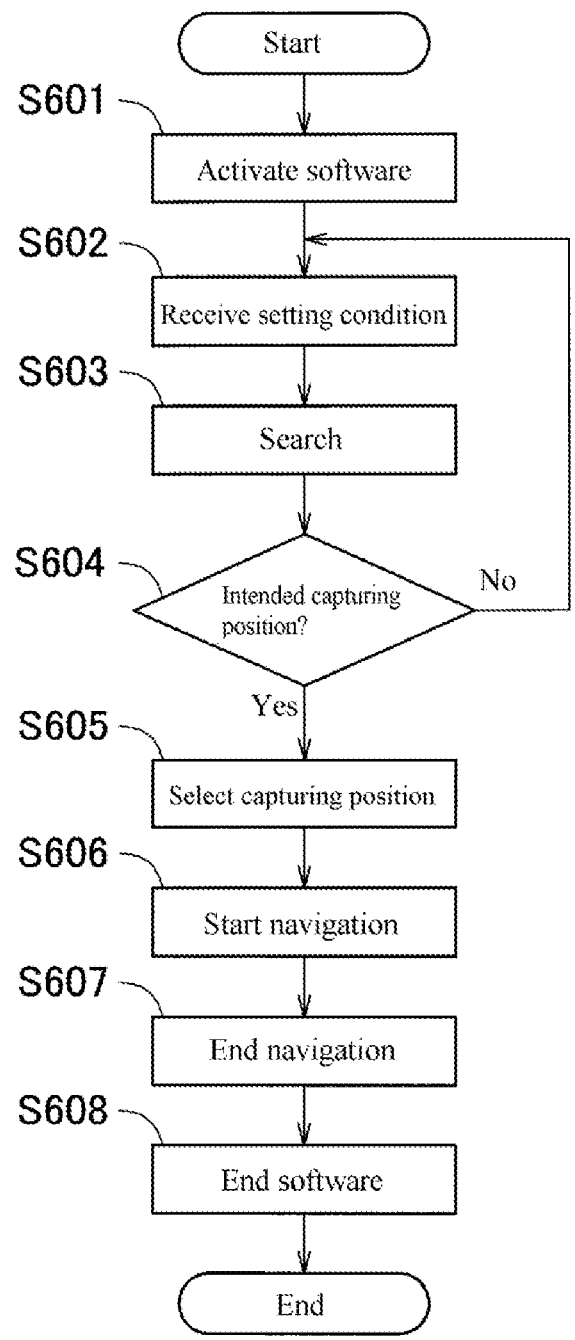
FIG. 11 is a flowchart of a process for displaying spot information and a route at content to be published for external access by the information processing device according to the other embodiment.

A navigation system used with the software to provide the navigation function will now be described with reference to FIGS. 11 to 13. The spot information is POI information, and is useful for a navigation function. The spot information is fresher than POI information used with an ordinary navigation function having less frequent updates, and thus can be highly reliable POI information.

The information processing terminal 3 includes the dedicated software installed in the third storage 33 for using the software implemented by the information processing device 1.

The third controller 31 first activates the dedicated software (step S601).

After step S601, the third display 34 displays map information. The third input unit 37 receives a setting condition (search condition) for outputting the spot information (step S602). Subsequently, the third controller 31 performs a search under the input setting condition (step S603). This search is the same as the search shown in FIG. 4, and may allow the setting condition to include the user attribute information described above. In other words, when used in Japan, the user attribute information may be added to indicate, for example, whether the information comes from a foreign visitor to Japan.

When the search in step S603 finds no spot information (capturing position) that matches the setting condition (No in step S604), the third controller 31 returns to step S602. When newly receiving a setting condition, the third controller 31 performs a search under the received setting condition (step S603).

When the search in step S603 finds spot information (capturing position) that matches the setting condition (Yes in step S604), the third controller 31 displays the matched spot information on the third display 34. More specifically, as shown in FIGS. 12 and 13, the third controller 31 displays spot information P1 to spot information P6 on the map. The spot information P1 to spot information P6 and landmarks are the same as the spot information shown in FIGS. 7 and 8.

Figure 12:
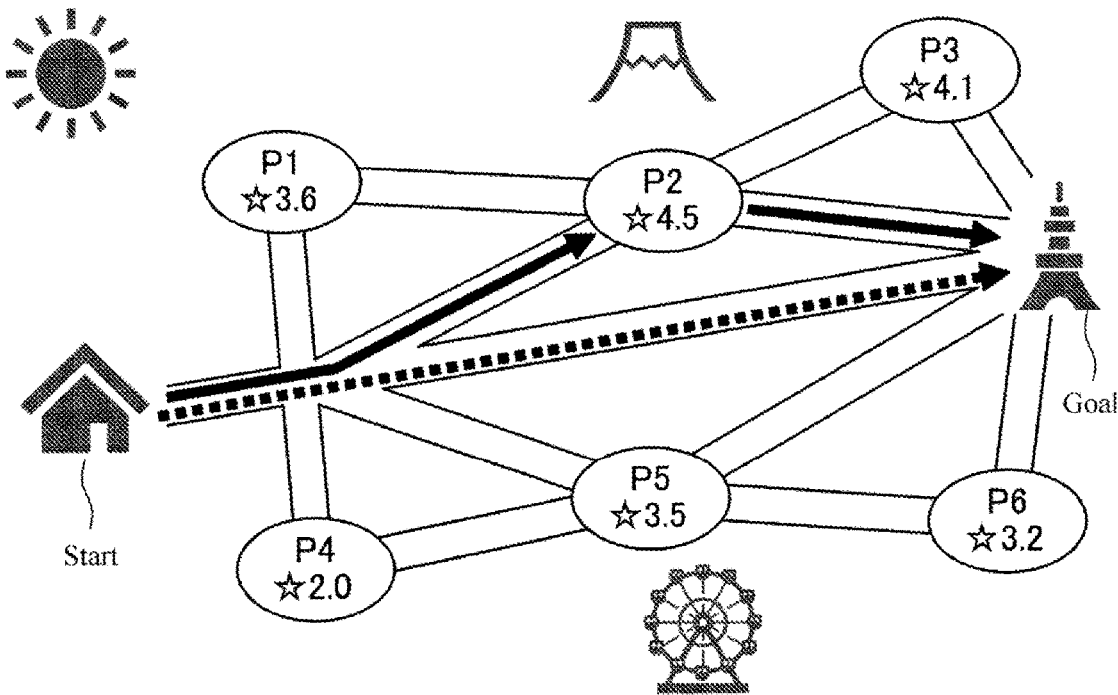
FIG. 12 is a diagram describing the content to be published for external access by the information processing device in the process shown in FIG. 11.
Figure 13:
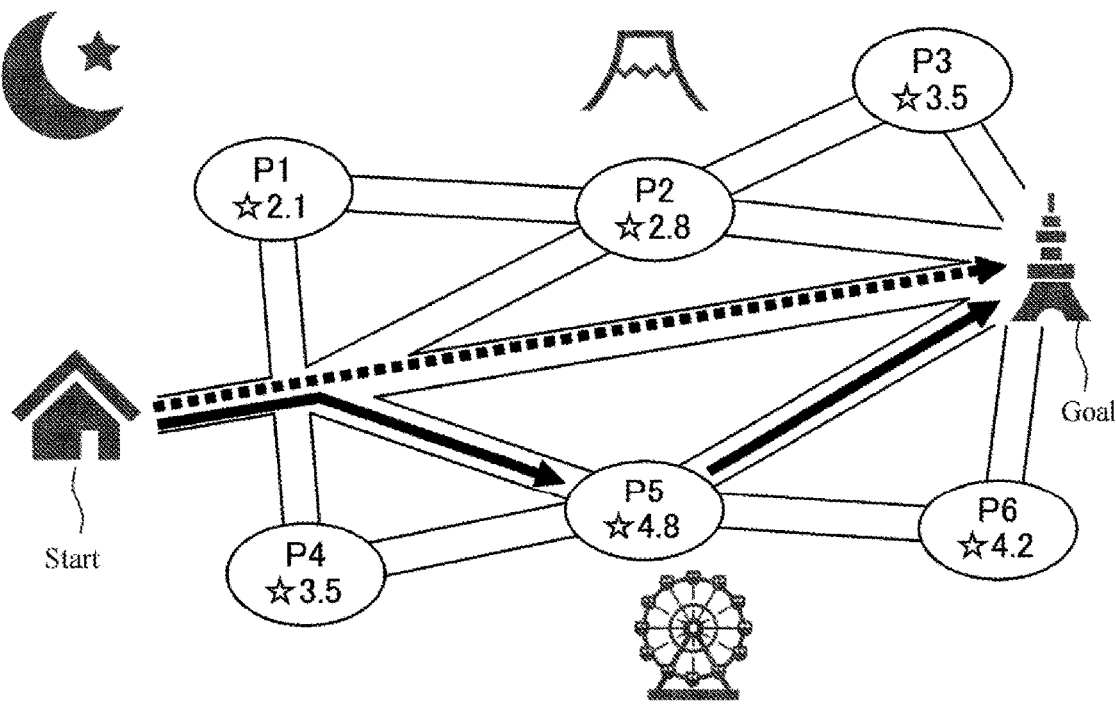
FIG. 13 is a diagram describing the content to be published for external access by the information processing device in the process shown in FIG. 11.

The third controller 31 then selects an intended piece of spot information from the spot information appearing on the map shown in FIG. 12 or 13, which is obtained through the search under the setting condition (step S605). The spot information may be displayed in accordance with, for example, travel time with a selected route. The navigation function of the third controller 31 may display the spot information for daytime, and change the information to spot information for nighttime during travel from the current position to a waypoint indicated by the spot information.

After step S605, the third controller 31 performs route setting for navigation using the intended piece of spot information selected as a destination on the display. In the map shown in FIGS. 12 and 13, the city tower is set as the destination. The third controller 31 starts navigation with either a route to directly travel to the city tower or a route to travel via a waypoint associated with another piece of spot information (step S606). More specifically, the third controller 31 starts navigation with the route indicated by the broken line in FIGS. 12 and 13, which connects the current position to the city tower, to directly travel to the city tower. To travel via a waypoint indicated by another piece of spot information, the third controller 31 starts navigation with the route indicated by the solid line in FIGS. 12 and 13 connecting the current position to the city tower via a waypoint indicated by a piece of spot information (spot information P2 in FIG. 12, and spot information P5 in FIG. 13). In FIG. 12, spot information P2 is used as a waypoint during navigation. In FIG. 13, spot information P5 is used as a waypoint during navigation.

The third controller 31 then ends navigation with the selected route (step S607), and stops implementing the software (step S608) to complete the process.

Figure 14:
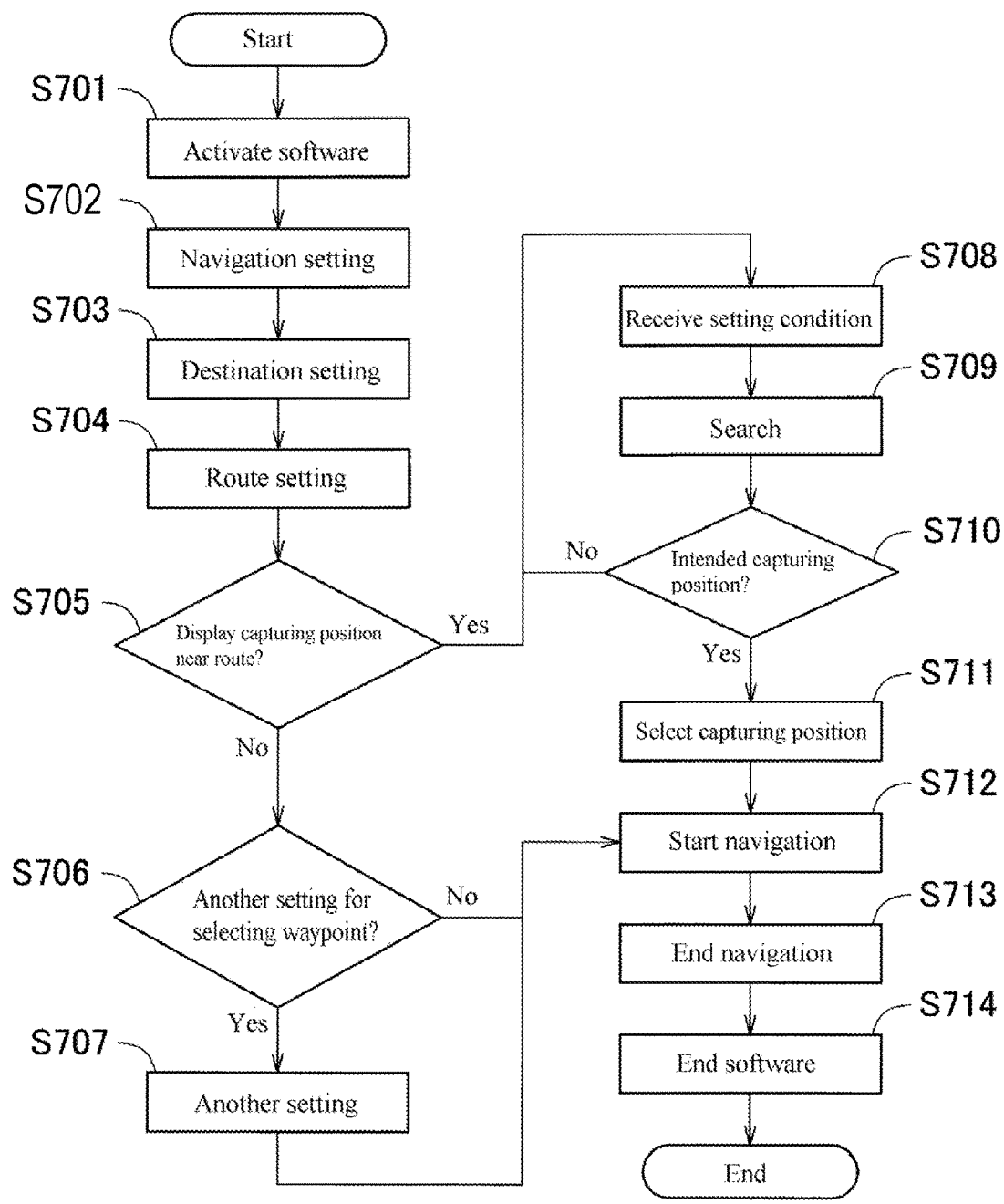
FIG. 14 is a flowchart of a process for displaying spot information and a route at content to be published for external access by an information processing device according to another embodiment.

The navigation described above with reference to FIG. 11 uses, as a destination, a piece of spot information on the map appearing on the third display 34 in the information processing terminal 3. However, the navigation function is not limited to these specifications. In some embodiments, the navigation function may allow navigation to select a waypoint in addition to the destination as shown in FIG. 14. In describing the operation shown in FIG. 14, processes different from the operation shown in FIG. 11 will be described. The same processes as shown in FIG. 11 will not be described.

The information processing terminal 3 includes the dedicated software installed in the third storage 33 for using the software implemented by the information processing device 1.

As shown in FIG. 14, the third controller 31 first activates the dedicated software (step S701).

After step S701, the third display 34 displays map information. The map displayed with the map information includes a current position at the center. In this state, the third controller 31 performs navigation setting (step S702) and destination setting (step S703).

In step S703, the third controller 31 performs the destination setting based on any information including address information, telephone number information, the spot information, or keyword information. The third controller 31 according to the present embodiment uses the city tower as the destination.

After the destination setting in step S703, the third controller 31 performs route setting (step S704). The route setting herein is performed under conditions such as routes to avoid tolls, recommended routes, shortest routes, or fastest routes.

When setting a route in step S704, the third controller 31 displays a selected route on the map. When the spot information (information about the position at which images are captured) near the route is found (Yes in step S705), the spot information appears on the map. To narrow the spot information to appear on the map, the third controller 31 receives a setting condition (step S708), and then performs a search under the received setting condition (step S709). This setting condition is the same as the setting condition shown in FIG. 11 described above (refer to S602).

When the search in step S709 finds no spot information (capturing position) that matches the setting condition (No in step S710), the third controller 31 returns to step S708. When newly receiving a setting condition, the third controller 31 performs a search under the received setting condition (step S709).

When the search in step S709 finds spot information (capturing position) that matches the setting condition (Yes in step S710), the third controller 31 displays the matched spot information on the third display 34. The spot information is displayed in the same manner as the spot information described with reference to S604 in FIG. 11.

The third controller 31 then selects an intended piece of spot information to set a waypoint from the spot information appearing on the map shown in FIG. 12 or 13, which is obtained through the search under the setting condition (step S711).

After step S711, the third controller 31 performs route setting for navigation using the intended piece of spot information selected as a destination on the display, and starts navigation with the route including the waypoint corresponding to the piece of spot information (step S712).

The third controller 31 then ends navigation with the selected route (step S713), and stops implementing the software (step S714) to complete the process.

When setting a route in step S704, the third controller 31 displays the selected route on the map. In addition, when displaying no spot information (information about the position at which images are captured) near the route (No in step S705), the third controller 31 performs another setting for selecting a waypoint. The other setting for selecting a waypoint refers to setting for selecting a waypoint based on any information other than the spot information, including address information, telephone number information, or keyword information.

When performing no other setting for selecting a waypoint (No in step S706), the third controller 31 starts navigation directly to the destination (step S712).

When performing the other setting for selecting a waypoint (Yes in step S706), the third controller 31 performs the other setting (step S707), and starts navigation with the other waypoint (step S712).

Another embodiment of the present invention will now be described. An information processing system according to the present embodiment differs from the embodiment described above mainly in that the information processing device 1 has a parsing function. The parsing function is to parse captured images using posted articles associated with photos posted onto an SNS. The information processing system according to the present embodiment includes the same components as in the embodiment described above. Such components may not be described.

As shown in FIG. 1, the information processing system according to the present embodiment includes the information processing device 1, the external information processing device 2, and the information processing terminal 3. The information processing terminal 3 is used by a user. The information processing terminal 3 has the capture function of capturing images, the timer function of measuring time, and the position determination function of determining a position. The information processing device 1, the external information processing device 2, and the information processing terminal 3 can communicate with one another. The external information processing device 2 publishes captured images transmitted from the information processing terminal 3 and received by the second communication unit 23 for external access. The external information processing device 2 publishes posted articles transmitted from the information processing terminal 3 and received by the second communication unit 23 for external access. The information processing device 1 generates spot information based on image information about the captured images and posted article information about the posted articles. The posted article information herein refers to, for example, information about articles to be posted by a user in a manner associated with captured images on an SNS.

The first controller 11 included in the information processing device 1 has the crawling function, the analysis function, the parsing function, and the categorization function. The crawling function is to obtain captured images and posted articles from the external information processing device 2. The crawling function is implemented by a computer executing a crawling program.

More specifically, the first controller 11 controls the first obtaining unit 17 in a manner to obtain captured images and posted articles. The first obtaining unit 17 obtains, from the external information processing device 2, captured images under an obtainment condition preset for captured images published for external access by the external information processing device 2. The first obtaining unit 17 obtains the captured images and the image information added to the captured images from the external information processing device 2 based on the relevant information about the captured images stored in a manner associated with the captured images. The first obtaining unit 17 also obtains posted article information from the external information processing device 2 based on an obtainment condition preset for posted articles published for external access by the external information processing device 2. The obtainment condition refers to the relevant information about the captured images stored in a manner associated with the captured images in the external information processing device 2. The obtainment condition also refers to the posted article information associated with the captured images. The image information is likely to include positional information and time information added to captured images when the images are captured. The image information may include the direction in which the images are captured. In other words, the first obtaining unit 17 obtains image files in which the image information is added to each captured image. The first obtaining unit 17 also obtains the posted article information associated with the image files.

The analysis function is to analyze the data for the image files obtained by the first obtaining unit 17. For image information, the analysis function is to analyze the data through, for example, pattern matching using prestored data.

For a captured image, the analysis function is to analyze the data by determining the degree of similarity between a feature quantity of data for a prestored captured image and a feature quantity of processed data for the obtained captured image that has undergone image processing. The analysis function is implemented by a computer executing an analysis program.

The parsing function is to parse the data for the posted articles obtained by the first obtaining unit 17. The parsing function is to parse the data by, for example, performing morphological parsing of the posted article information and determining whether the resultant morphemes match prestored words. Morphological parsing divides a sentence or a phrase into the smallest units with a meaning. The parsing function may include parsing the data by performing morphological parsing of the posted article information and then determining the degree of similarity between a prestored word and a feature word. The parsing function is implemented by a computer executing a parse program.

More specifically, the first obtaining unit 17 parses the captured images using the posted articles associated with posted photos. The first obtaining unit 17 performs morphological parsing of the obtained posted article information. The first obtaining unit 17 learns words obtained through morphological parsing using machine learning in accordance with predetermined categories. The first obtaining unit 17 thus estimates a subject in each captured image through machine learning. When a posted article includes a phrase "I saw a beautiful sunset," the first obtaining unit 17 obtains the words "saw," "beautiful," and "sunset" through morphological parsing. The first obtaining unit 17 determines the degree of similarity between prestored feature words and the above obtained words through machine learning, and thus estimates that the subject is a sunset with an unspecific position.

The categorization function is to categorize data for image files obtained by the first obtaining unit 17 based on the results of analysis and parsing of the captured images, the image information, and the posted articles. The categorization function is implemented by a computer executing a categorization program. In other words, the first controller 11 operates in accordance with the crawling program, the categorization program, the parsing program, or the analysis program stored in, for example, the first storage 13.

The first controller 11 generates spot information based on the image information and the subject information stored in the first storage 13. The subject information may be information used to estimate a subject generated based on the posted article information. The first controller 11 generates the spot information based on the image information and the subject information. The spot information is generated based on, for example, the positional information, the time information, and the subject information. The first controller 11 categorizes the image information and the subject information stored in the first storage 13 under preset attribute conditions. The attribute conditions include, for example, the time information, the positional information, and the subject information. The categorization function according to the present embodiment is to categorize the image files of the captured images based on the positional information, the time information, and the subject information. In other words, the information processing device 1 categorizes the captured images based on the image information and the posted article information. The information processing device 1 uses a group of captured images collected and grouped under each preset attribute condition as spot information.

The operation of the entire information processing system according to the present embodiment will now be described.

The relationship between the external information processing device 2 and the information processing terminal 3 will be described first. The information processing system according to the present embodiment publishes captured images captured by the information processing terminal 3 and posted articles for external access by the external information processing device 2.

The information processing terminal 3 selects the external information processing device 2 for publishing the captured images captured by the third capturing unit 38 and the posted articles to be posted onto an SNS input through the third input unit 37 for external access. For example, the information processing terminal 3 that has completed editing the captured images transmits the captured images with the image information to the external information processing device 2A through the third communication unit 35, and posts the captured images to be published for external access through the external content provided by the external information processing device 2A. Similarly, the information processing terminal 3 transmits the posted article information input relevant to the captured images to the external information processing device 2A through the third communication unit 35, and posts the articles to be published for external access through the external content provided by the external information processing device 2A. The external information processing device 2A publishes the posted captured images and the posted articles associated with the captured images for external access.

Figure 15:
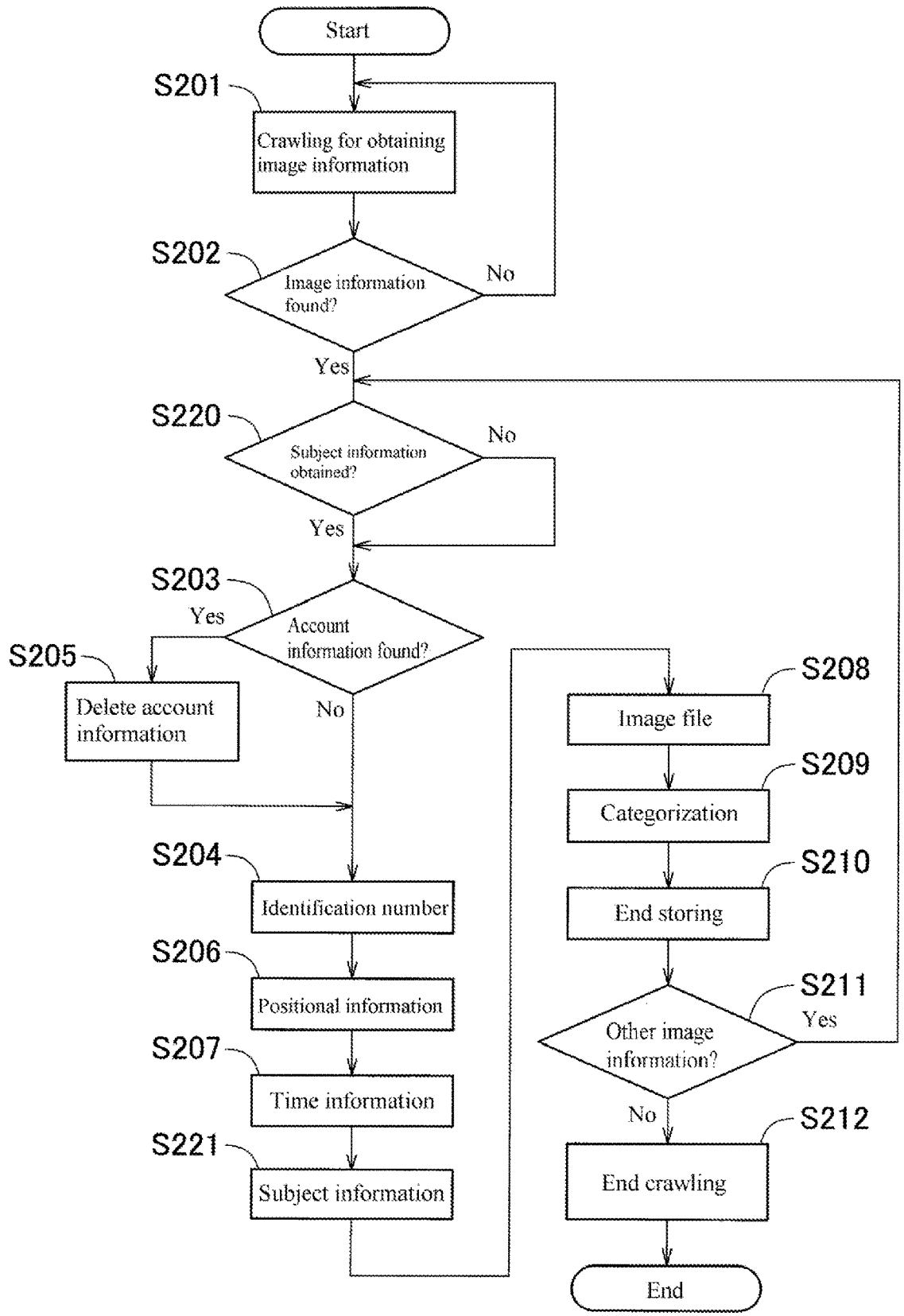
FIG. 15 is a flowchart of a process performed by an information processing device for obtaining captured images and posted articles in an information processing system according to another embodiment.

The relationship between the information processing device 1 and the external information processing device 2 will now be described with reference to FIG. 15. The flowchart shown in FIG. 15 further includes, as processes to be performed by the information processing device 1, step S220 and step S221 in addition to steps S201 through S212 shown in FIG. 4 described in the above embodiment. The information processing device 1 obtains image information about captured images published for external access through the external content by the external information processing device 2. The information processing device 1 stores the obtained image information.

The first obtaining unit 17 included in the information processing device 1 provides a request to obtain information in accordance with the crawling program for performing operational control in the first controller 11. The information processing device 1 performs a crawling process for obtaining the image information (S201). The information processing device 1 in the above process performs a search through crawling to determine whether any captured image has been published for external access by the external information processing device 2.

When the information processing device 1 finds any captured image that can be obtained during the crawling process (Yes in S202), the information processing device 1 obtains the captured image and image information about the captured image. When the information processing device 1 finds no captured image that can be obtained in the crawling process (No in S202), the information processing device 1 again performs the process for obtaining the image information through a search through crawling (S201).

The information processing device 1 then performs a subject information obtaining process for obtaining subject information from posted articles associated with the captured image (S220), in addition to the captured image and the image information about the captured image. For the captured image and the image information that can be obtained alone with no posted article information (No in S220), the information processing device 1 obtains no subject information, and simply obtains the captured image and the image information.

The information processing device 1 then performs an account information determination process (S203) for determining whether the obtained image information or posted article information includes account information about the external content published for external access by the external information processing device 2. When the information processing device 1 finds the account information about the external content in the account information determination process (Yes in S203), the information processing device 1 performs an account deletion process for deleting the account information (S205). After deleting the account information, the information processing device 1 performs an identification number addition process for adding an identification number to the image information (S204).

After adding the identification number to the image information, the information processing device 1 performs a positional information storing process for storing positional information included in the image information into the first storage 13 (S206). After adding the identification number to the image information, the information processing device 1 performs a time information storing process for storing time information included in the image information into the first storage 13 (S207). After adding the identification number to the image information, the information processing device 1 performs a subject information storing process for storing subject information into the first storage 13 (S221). After adding the identification number to the image information, the information processing device 1 performs an image file storing process for storing the image file into the first storage 13 (S208). The information processing device 1 may change the order to obtain or store the positional information and the time information included in the image information, the subject information, and the image file as appropriate.

The first controller 11 performs a categorization process for categorizing the image file based on the image information and the subject information about the captured image in accordance with the categorization program (S209). During the categorization process, the first controller 11 determines whether the image information indicates a distant image in which the subject is captured from a distance based on, for example, the posted article information. The first controller 11 also determines whether the positional information about the subject is unspecified, like in a sunset with the subject moving with time based on, for example, the posted article information.

After performing the categorization process, and the information processing device 1 completes its operation of storing the image information, the subject information, and the image file of the captured image into the first storage 13 (S210). FIG. 16 shows an example data table including the image information, the subject information, and each image file stored in the first storage 13.

Finally, the information processing device 1 reflects the image information, subject information, and image file of the captured image obtained by the first obtaining unit 17 and stored in the first storage 13 in the content to be published by the information processing device 1 for external access, and thus ends the process.

The other information processing system according to the present embodiment allows captured images published for external access by the external information processing device 2 to be used for purposes other than viewing. More specifically, the information processing device 1 includes the first obtaining unit 17, the first storage 13, and the first controller 11. The first controller 11 categorizes image files based on positional information, time information, and subject information. The information processing device 1 categorizes image files based on positional information, time information, and subject information, and can thus collect each image file based on the relationship between the time of capturing, the position of capturing, and the information about the subject. The information processing device 1 can thus collect information about a specific position published for external access by the external information processing device 2 frequently in a manner associated with the subject information. The information processing device 1 categorizes an image file as appropriate when, for example, a posted photo on an SNS includes a subject away from the point at which the photo is captured, or when the subject is associated with an unspecific position like a sunset.

The components described in the above embodiments may be combined as appropriate.

The present invention may be embodied in various other forms without departing from the spirit or the main features of the present invention. The embodiments described above are thus merely illustrative in all respects and should not be construed to be restrictive. In other words, the present invention is directed to the information processing device, the information processing system, or the information processing program described using the above embodiments as examples.

The scope of the present invention is not bound by the description given above but determined by the claims. Any modifications and alterations contained in the range of equivalency of the claims are intended to fall within the scope of the present invention.

INDUSTRIAL APPLICABILITY

The present invention is applicable to an information processing device, an information processing system, and an information processing program.

REFERENCE SIGNS LIST 1 information processing device
11 first controller
12 first temporary storage
13 first storage
14 first display
15 first communication unit
16 first input unit
17 first obtaining unit
2 (2A, 2B) external information processing device
21 second controller
22 second storage
23 second communication unit
3 information processing terminal
31 third controller
32 third temporary storage
33 third storage
34 third display
35 third communication unit
36 third output unit
37 third input unit
38 third capturing unit

The invention claimed is:
1. An information processing device, comprising: a processor configured to implement:

an obtaining unit configured to obtain, from an external information processing device, image information added to a captured image published for external access by the external information processing device under a preset obtainment condition;

a storage configured to store the image information obtained by the obtaining unit; and a controller configured to categorize the image information stored in the storage under a preset attribute condition, wherein the image information includes at least positional information, time information each added to the captured image, and user attribute information about an account for content provided by the external information processing device, the user attribute information being about a user who has posted the captured images through the external information processing device, and the controller categorizes the image information at least based on the positional information and the time information.

2. The information processing device according to claim 1, wherein the obtainment condition is relevant information relevant to the captured image stored in a manner associated with the captured image, and the obtaining unit obtains the captured image from the external information processing device based on the relevant information relevant to the captured image stored in a manner associated with the captured image.

3. A non-transitory computer-readable recording medium recording information processing program causing a computer to implement:

obtaining, from an external information processing device, image information added to a captured image published for external access by the external information processing device under a preset obtainment condition;

storing the image information obtained in obtaining the image information; and categorizing the image information stored in storing the image information under a preset attribute condition, wherein the image information includes at least positional information, time information each added to the captured image, and user attribute information about an account for content provided by the external information processing device, the user attribute information being about a user who has posted the captured images through the external information processing device, and categorizing the image information includes categorizing the image information at least based on the positional information and the time information.

4. An information processing system, comprising:

an external information processing device configured to publish a captured image captured and transmitted by an information processing terminal for external access; and an information processing device configured to communicate with the information processing terminal and the external information processing device, wherein the information processing device includes a processor configured to implement:

an obtaining unit configured to obtain, from the external information processing device, image information added to the captured image published for external access by the external information processing device under a preset obtainment condition, a storage configured to store the image information obtained by the obtaining unit, a controller configured to categorize the image information stored in the storage under a preset attribute condition, and a communication unit configured to transmit the categorized image information to the information processing terminal, the image information includes at least positional information, time information each added to the captured image, and user attribute information about an account for content provided by the external information processing device, the user attribute information being about a user who has posted the captured images through the external information processing device, and the controller categorizes the image information at least based on the positional information and the time information.

5. An information processing device, comprising:

a processor configured to implement:

an obtaining unit configured to obtain, from an external information processing device, image information added to a captured image published for external access by the external information processing device under a preset obtainment condition;

a storage configured to store the image information obtained by the obtaining unit;

a controller configured to generate spot information based on the image information stored in the storage; and a communication unit configured to output the spot information generated by the controller to an information processing terminal, wherein the image information includes at least positional information, time information each added to the captured image, and user attribute information about an account for content provided by the external information processing device, the user attribute information being about a user who has posted the captured images through the external information processing device, and the spot information is generated from the image information at least based on the positional information and the time information.

6. The information processing device according to claim 5, wherein the spot information is updatable information.

7. The information processing device according to claim 5, wherein the spot information is stored into the storage.

8. The information processing device according to claim 5, wherein the communication unit is configured to use a group of pieces of image information as the spot information, and to output positional information about the group of pieces of image information to the information processing terminal.

9. The information processing device according to claim 5, wherein the spot information is point of interest information.

10. An information processing system, comprising:

an information processing device;

an information processing terminal; and an external information processing device, wherein the information processing device, the information processing terminal, and the external information processing device are communicably connected to one another, the information processing device includes a storage configured to store image information added to a captured image published for external access by the external information processing device, the information processing terminal includes a display configured to display spot information generated based on the image information stored in the storage, the image information includes at least positional information, time information each added to the captured image, and user attribute information about an account for content provided by the external information processing device, the user attribute information being about a user who has posted the captured images through the external information processing device, and the spot information is generated from the image information at least based on the positional information and the time information and stored into the storage.

11. A non-transitory computer-readable recording medium recording information processing program causing a computer to implement:

obtaining, from an external information processing device, image information added to a captured image published for external access by the external information processing device under a preset obtainment condition;

storing the image information obtained in obtaining the image information;

generating spot information based on the image information stored in storing the image information; and outputting the spot information generated in generating the spot information to an information processing terminal, wherein the image information includes at least positional information, time information each added to the captured image, and user attribute information about an account for content provided by the external information processing device, the user attribute information being about a user who has posted the captured images through the external information processing device, and the spot information is generated from the image information at least based on the positional information and the time information.

* * * * *